US011252190B1

(12) United States Patent
Sharifi Mehr

(10) Patent No.: US 11,252,190 B1
(45) Date of Patent: Feb. 15, 2022

(54) LIMITED ACCESS POLICY BYPASS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/694,973

(22) Filed: Apr. 23, 2015

(51) Int. Cl.
*H04L 29/06* (2006.01)

(52) U.S. Cl.
CPC .............. *H04L 63/20* (2013.01); *H04L 63/10* (2013.01)

(58) Field of Classification Search
CPC ................................ H04L 63/20; H04L 63/10
USPC ............................................................ 726/1
See application file for complete search history.

(56) References Cited

U.S. PATENT DOCUMENTS

| | | | | |
|---|---|---|---|---|
| 7,039,706 B1* | 5/2006 | Parker | ................. | H04L 12/2856 370/237 |
| 7,106,756 B1* | 9/2006 | Donovan | ................. | H04L 47/15 370/395.21 |
| 7,328,263 B1* | 2/2008 | Sadjadi | ................... | H04L 67/10 709/225 |
| 7,900,247 B2 | 3/2011 | Chong | | |
| 8,078,483 B1* | 12/2011 | Hirose | .................... | H04L 43/08 705/5 |
| 8,392,564 B1* | 3/2013 | Czajkowski | ............ | H04L 43/12 709/226 |
| 8,694,400 B1* | 4/2014 | Certain | .................. | G06Q 30/08 705/35 |
| 8,750,170 B2* | 6/2014 | Cutler | ................. | H04L 41/5029 370/259 |
| 8,775,810 B1 | 7/2014 | Snodgrass et al. | | |
| 9,172,724 B1 | 10/2015 | Reddy et al. | | |
| 9,202,076 B1 | 12/2015 | Chazin et al. | | |
| 10,135,750 B1* | 11/2018 | Patil | ........................ | H04L 47/70 |
| 2002/0073058 A1* | 6/2002 | Kremer | ............. | G06F 17/30864 |
| 2002/0116622 A1 | 8/2002 | Okaue et al. | | |
| 2003/0023661 A1* | 1/2003 | Clohessy | .............. | G06F 9/5022 718/104 |
| 2005/0005165 A1* | 1/2005 | Morgan | .............. | H04L 63/0227 726/4 |
| 2005/0228892 A1* | 10/2005 | Riley | ..................... | H04L 67/325 709/228 |
| 2006/0041668 A1* | 2/2006 | Dinger | .................... | H04L 43/00 709/229 |
| 2006/0047605 A1* | 3/2006 | Ahmad | ............... | G06F 21/6245 705/64 |
| 2006/0059548 A1* | 3/2006 | Hildre | ..................... | G06F 21/34 726/9 |

(Continued)

*Primary Examiner* — Aravind K Moorthy

(74) *Attorney, Agent, or Firm* — Davis Wright Tremaine LLP

(57) ABSTRACT

The current document discloses systems and methods that implement access controls for service providers. When a client requests access to a service provider, but does not satisfy the conditions for non-limited access, the service provider provides limited access to the services based at least in part on a limited access policy. The limited access policy establishes a limitation that defines when the limited access to the service provider expires. In some implementations, the service provider issues a signed access token to the client, and the access token includes an expiration value that is updated when service requests are processed. When the access token expires, access to the service is terminated.

20 Claims, 16 Drawing Sheets

(56) References Cited

U.S. PATENT DOCUMENTS

| | | | |
|---|---|---|---|
| 2006/0218243 A1* | 9/2006 | Kudo | G06F 9/505 709/218 |
| 2007/0027917 A1* | 2/2007 | Ariel | G06F 16/285 |
| 2007/0240206 A1* | 10/2007 | Wu | H04L 63/0815 726/8 |
| 2008/0046963 A1* | 2/2008 | Grayson | H04L 67/322 726/1 |
| 2008/0059474 A1* | 3/2008 | Lim | G06F 17/3089 |
| 2008/0222643 A1* | 9/2008 | Baryshnikov | G06F 9/4881 718/104 |
| 2008/0233992 A1* | 9/2008 | Oteri | H04W 52/262 455/522 |
| 2009/0193493 A1 | 7/2009 | Becker et al. | |
| 2010/0083386 A1* | 4/2010 | Kline | G06F 21/33 726/34 |
| 2010/0100949 A1* | 4/2010 | Sonwane | H04L 63/102 726/7 |
| 2010/0211666 A1* | 8/2010 | Kvernvik | H04L 41/0681 709/223 |
| 2010/0241743 A1* | 9/2010 | Perira | H04L 67/1002 709/224 |
| 2010/0274893 A1* | 10/2010 | Abdelal | H04L 47/10 709/224 |
| 2010/0303075 A1* | 12/2010 | Tripathi | G06F 13/385 370/392 |
| 2010/0319051 A1* | 12/2010 | Bafna | G06F 21/6218 726/1 |
| 2011/0282981 A1* | 11/2011 | Cutler | H04W 4/00 709/223 |
| 2011/0321117 A1 | 12/2011 | Nestler et al. | |
| 2012/0054323 A1* | 3/2012 | Chandrasekaran | H04L 12/66 709/223 |
| 2012/0131646 A1* | 5/2012 | Chandolu | G06F 21/6218 726/4 |
| 2012/0192186 A1* | 7/2012 | Bornstein | G06F 9/5011 718/100 |
| 2012/0216285 A1* | 8/2012 | Walsh | G06F 21/53 726/26 |
| 2012/0250613 A1* | 10/2012 | Robinson | H04W 4/18 370/328 |
| 2012/0260322 A1* | 10/2012 | Logan | G06F 21/33 726/6 |
| 2012/0297133 A1* | 11/2012 | Sundrani | G06F 11/1076 711/113 |
| 2013/0006784 A1* | 1/2013 | Krauss | G06Q 20/388 705/18 |
| 2013/0054988 A1* | 2/2013 | Litovtchenko | G06F 1/3203 713/300 |
| 2013/0097349 A1* | 4/2013 | Lu | G06F 13/36 710/122 |
| 2013/0103641 A1* | 4/2013 | Rehman | G06F 11/3065 707/609 |
| 2013/0138815 A1* | 5/2013 | Gandhi | G06F 13/16 709/226 |
| 2013/0179199 A1* | 7/2013 | Ziskind | G06F 21/10 705/5 |
| 2013/0191541 A1* | 7/2013 | Kishan | G06F 15/173 709/226 |
| 2013/0198835 A1* | 8/2013 | Huang | G06F 21/31 726/19 |
| 2013/0219395 A1* | 8/2013 | Geibel | G06F 9/5072 718/101 |
| 2013/0268285 A1* | 10/2013 | Backes | G16H 30/20 705/2 |
| 2013/0312066 A1* | 11/2013 | Suarez | G16H 40/63 726/4 |
| 2014/0026193 A1* | 1/2014 | Saxman | G06F 21/33 726/4 |
| 2014/0050371 A1* | 2/2014 | Inkumsah | G06F 21/36 382/117 |
| 2014/0109190 A1* | 4/2014 | Cam-Winget | G06F 21/30 726/4 |
| 2014/0157019 A1* | 6/2014 | Yokoyama | G06F 1/329 713/320 |
| 2014/0181950 A1* | 6/2014 | Hadas | G06F 21/53 726/12 |
| 2014/0282916 A1* | 9/2014 | Gast | H04L 63/0823 726/4 |
| 2014/0330936 A1* | 11/2014 | Factor | H04L 63/0281 709/219 |
| 2014/0331276 A1* | 11/2014 | Frascadore | H04L 63/20 726/1 |
| 2015/0009522 A1* | 1/2015 | Caprio da Costa Junior | G06F 3/1238 358/1.14 |
| 2015/0052250 A1* | 2/2015 | Doganata | G06F 9/5083 709/226 |
| 2015/0149610 A1* | 5/2015 | Jhanb | H04L 43/08 709/224 |
| 2015/0172261 A1* | 6/2015 | Counterman | H04L 63/0815 726/7 |
| 2015/0181415 A1* | 6/2015 | Raleigh | H04W 4/24 455/418 |
| 2015/0301824 A1* | 10/2015 | Patton | G06F 8/71 717/122 |
| 2015/0304736 A1* | 10/2015 | Lal | G06F 21/72 380/210 |
| 2015/0379031 A1* | 12/2015 | Banatwala | G06F 16/248 707/785 |
| 2016/0019250 A1* | 1/2016 | Kumar | G06F 16/2291 707/740 |
| 2016/0088016 A1* | 3/2016 | Emerson | G06F 21/604 726/1 |
| 2016/0117180 A1* | 4/2016 | Cardonha | G06F 11/3024 713/100 |
| 2016/0170911 A1* | 6/2016 | Devgan | G06F 12/1483 711/118 |
| 2016/0173532 A1* | 6/2016 | Yoo | G06F 15/16 726/1 |
| 2016/0234215 A1* | 8/2016 | Shankar | H04L 63/10 |
| 2016/0239418 A1* | 8/2016 | Drapala | G06F 12/0813 |
| 2016/0260310 A1* | 9/2016 | Chuang | G08B 25/08 |
| 2016/0285998 A1* | 9/2016 | Hardy | H04L 41/0806 |
| 2017/0116431 A1* | 4/2017 | Lee | G06F 21/604 |
| 2017/0186106 A1* | 6/2017 | Soboil | G06F 21/6245 |
| 2017/0201871 A1 | 7/2017 | Ryu et al. | |

* cited by examiner

LIMITED ACCESS POLICY BYPASS

BACKGROUND

Creating and maintaining proper access controls is an important aspect of providing a service. Contemporary service providers provide services to large numbers of authorized users over complex and dynamic networks. As the number of authorized users increases, and as the network infrastructure that supports the service changes, it can become increasingly difficult to maintain proper and up-to-date access controls. For example, in some systems, access controls are conditioned on the Internet protocol ("IP") address of the client device that is used to access the service. In some network environments such as the Internet, IP address ranges are frequently added and removed. This can often lead to changes in the IP addresses used by authorized clients. As a result, access controls that are conditioned on the IP addresses used by authorized clients may need to be frequently updated. Accordingly, in many environments, access controls are often at least partly out-of-date, and access to the service may be interrupted for some authorized users.

BRIEF DESCRIPTION OF THE DRAWINGS

Various embodiments in accordance with the present disclosure will be described with reference to the drawings, in which.

DETAILED DESCRIPTION

Figure 1:
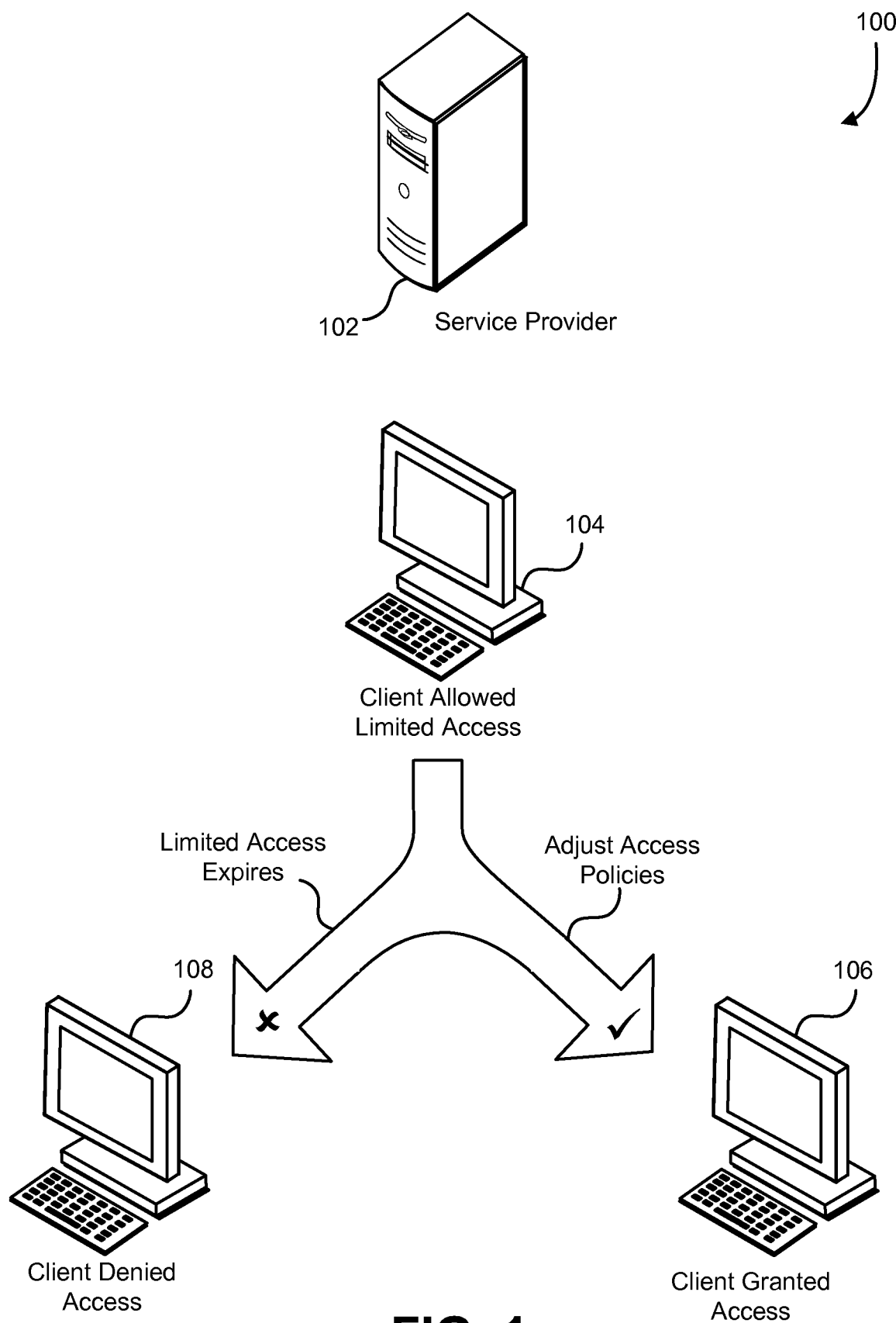
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods that implement access controls for a service provider. When a client requests access to a service and fails to meet the conditions for non-limited access, the access controls consult a number of limited access policies that, in some situations, permit limited access to the service. The terms of the limited access are established by the limited access policies, and may include a reduced level of access, and an expiration value. In one example, when a client does not qualify for non-limited access to the service, the service provider grants limited access that expires after an amount of time. In another example, when a client does not qualify for non-limited access to the service, the service provider grants limited access that expires after a particular amount of services are consumed (i.e., a fixed amount of data is transferred or a certain number of pages are printed).

In one implementation of the access control system, a service provider includes a policy module that maintains an access policy database that supports non-limited access policies and limited access policies. When a client requests a particular level of access to a service, the identity and characteristics of the client are confirmed by an authentication module. The identity and characteristics of the client are sent to an authorization module. The authorization module queries the policy module, which determines which access policies, if any, permit the level of access requested by the client. When there is not a non-limited policy that provides the client the requested level of access, the policy module attempts to locate a limited access policy that provides the requested level of access. When a suitable limited access policy is found, the authorization module grants limited access to the service. If no policy is found that provides the client with the requested level of access, access to the service is denied.

Non-limited access policies and limited access policies can be combined to form highly customized and flexible access schemes. In some implementations, limited access policies provide a temporary higher level of access than non-limited access policies. In one example, a non-limited access policy provides a client with full read access to a storage resource, and a limited access policy provides a client with write access for up to three days, with a quota of 2 MB data writing. In additional implementations, limited access policies provide a temporarily lower level of access than non-limited access policies. For example, a non-limited access policy provides a client with full read and write access to a storage resource, and a limited access policy denies the client write access for three days. In yet another implementation, when limited access expires, a second limited access policy permits a second level of limited access.

FIG. 1 shows an illustrative example of an environment in which various embodiments may be practiced. The environment 100 includes a service provider 102 that provides a service to client computers. Access control for the service is based at least in part on a collection of limited and non-limited access policies. When a new client 104 requests access to the service, and there is not a non-limited access policy that permits the requested level of access, the new client 104 may be granted limited access to the service using a limited access policy. For example, in one implementation, a limited access policy permits access to the new client 104 for a limited amount of time. After limited access to the service is granted, a non-limited access policy can be modified so that the new client 104 qualifies for a non-limited level of access. Once the non-limited policies are modified, the new client 104 becomes a non-limited client 106, and the non-limited client 106 retains access to the service that does not expire. If the non-limited access policies are not modified before the expiration of the limited access granted to the new client 104, the limited access expires and new client 104 becomes a denied client 108. The denied client 108 cannot access the service, and cannot immediately reuse the same limited access policy to regain limited access. In some implementations, the denied client 108 can be granted a second limited level of access by a second limited access policy. In yet another implementation, a denied client can regain the limited level of access using the same limited access policy after a timeout value has elapsed.

In some environments, service providers that implement limited access policies are able to strengthen their non-limited access policies. The limited access policies provide a way for less-secure clients to access the service while the administrator of the service updates the non-limited access policies, or deploys increased security measures on the less-secure clients. For example, in one implementation, non-limited access policies permit access to a service to clients that use communication channels originating from particular IP address ranges. Limited access policies which expire after an amount of time permit access to the service to clients that use communication channels originating from outside the particular IP address ranges. The client, and the administrator of the service provider, are notified when the limited access policies are used. While the client has limited access to the service, the administrator can modify the non-limited access policy to include the IP address ranges used by the client. Once the non-limited access policy is updated, the client can be granted non-limited access before the limited access expires. In this way, the administrator has time to update the permitted IP address ranges in response to changes in the network topology and/or authorized user base without interrupting access to authorized clients.

In some implementations, limited access policies are linked to associated non-limited access policies. When limited access is granted to a particular client, the conditions for application of the limited access policy are compared to the conditions for the application of the associated non-limited access policy. The conditions for the application of the non-limited access policy that are not conditions for the application of the limited access policy are communicated to the client and/or the administrator of the service provider. In another implementation, the conditions of the non-limited access policy which are not satisfied by the client are communicated to the client and/or the administrator of the service provider. The unsatisfied conditions of the non-limited access policy represent a reason that the client was granted limited access, rather than non-limited access.

In various implementations, a service provider administers access controls by using an authentication module and an authorization module. The authentication module confirms the identity of a requesting entity (i.e., who or what is making the request). An entity can be a computer, a user, or a user the makes requests from any number of computers. For example, a login and password can be used by an authentication module to authenticate that a client requesting access to a service is under the control of a particular person. The authentication module, in some implementations, determines various characteristics of the client including group membership, administrative roles, client type, and characteristics of the communication channel used to access the service provider. The identity of the client, and characteristics associated with the client, are used individually or in combination by the authorization module. The authorization module has access to a database of access policies. Access policies define various access rights that are associated with particular client identities and/or client characteristics. In some implementations, the authorization module interrogates the access policy database and determines, based at least in part on access policies applicable to a particular client, the appropriate level of access to grant the particular client.

For example, a particular access policy may specify that the particular person is permitted unlimited read/write access to a network-attached storage device. When the service provider receives a request for access to the network-attached storage device from a particular client, the authentication module uses a login and password to determine that the particular person is using the particular client to access the network-attached storage device. This information is provided to the authorization module, which examines the policies in the access policy database, and finds only the policy that grants the particular person unlimited read/write access. As a result, the authorization module grants the particular client unlimited read/write access to the network-attached storage device.

Figure 2:
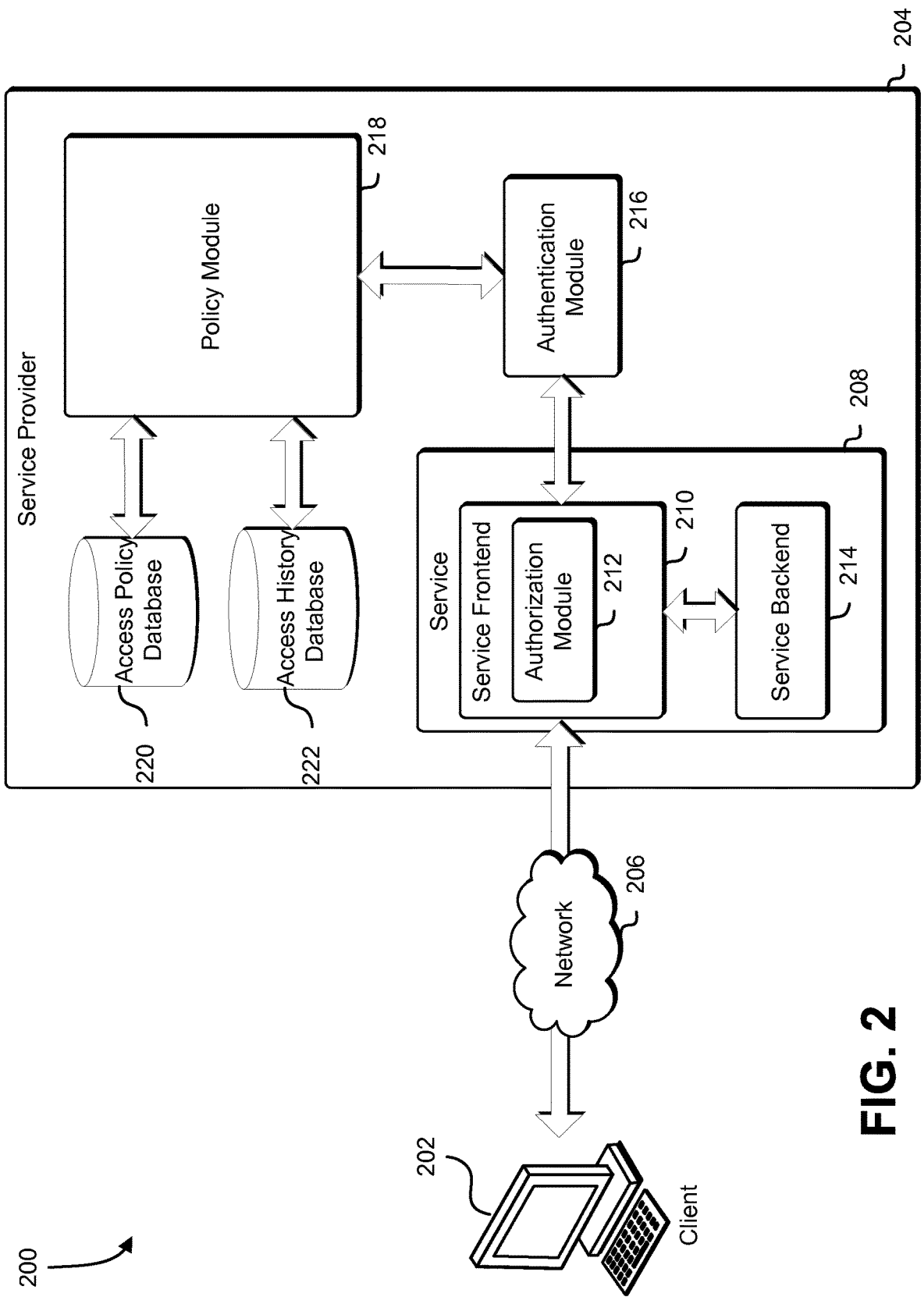
FIG. 2 shows an illustrative example of a service provider that provides services to a client computer over a computer network in accordance with an embodiment.

FIG. 2 shows an illustrative example of a service provider that provides services to a client computer over a computer network in accordance with an embodiment. The environment 200 includes a client computer 202 connected to a service provider 204 by way of a computer network 206.

In the particular example of FIG. 2, the service provider 204 includes a service 208 that includes a service frontend 210 that communicates with the client computer 202 over the computer network 206. An authorization module 212 is part of the service frontend 210 and authorizes access requests sent by various clients. A service backend 214 provides a resource that is used by the service 208. For example, for a network storage service, the service backend 214 provides storage services.

The service provider 204 includes an authentication module 216 that confirms the identity and characteristics of a client. In one implementation, when a particular client makes a request to the service provider 204, the authorization module 212 delivers authorized requests from the particular client to the authentication module 216. The requests are authenticated using information that includes identifying information such as a username, an IP address used by the particular client, a type of hardware used by the particular client, or a group to which the user or particular client belongs. The authentication module 216 determines applicable access policies that are maintained by a policy module 218.

The policy module 218 maintains an access policy database 220 and an access history database 222. The access policy database 220 retains access policies used by the service provider 204 to control access. The access policies can include limited access policies and non-limited access policies. In one implementation, the access policy database 220 retains limited access policies where each limited access policy optionally has a link to an associated non-limited access policy. When a particular client is granted access based at least in part on a limited access policy, the link to an associated non-limited access policy provides an upgrade path for the client's access rights. The authentication module 216 determines the conditions required by the associated non-limited access policy that are not satisfied by the particular client, and communicates the failed conditions to the particular client. In certain situations, this provides the particular client with information that enables the particular client to identify why limited access was granted and how non-limited access may be obtained.

When the service provider 204 processes a request from a particular client, the policy module 218 queries the access policy database 220 to identify the access policies that apply to the client's request. If the request is granted, information relating to the access request is saved in the access history database 222, and the service backend 214 performs the request.

In some implementations, an access token is issued to the client when the request is granted. The access token is signed using a cryptographic key known to the service provider or, in some implementations, the access token is encrypted. A particular access token can be a limited access token or a non-limited access token. A limited access token includes an expiration and a limitation. The expiration describes the conditions under which access to the service is terminated. The expiration is cryptographically enforced, which can be accomplished by the access token being encrypted and/or digitally signed by the service provider. Expiration can be calculated based at least in part on an amount of elapsed time, resources consumed by the client, number of service requests by the client, or other measurable resources. Examples of measurable resources include processing cycles, memory use, disk storage, data transfer, network bandwidth, power usage, cooling capacity, battery usage, and memory-write cycles. In some implementations, resource measurement includes resources used and additional resources caused to be used by the request such as memory, CPU cycles, and storage on other servers used when fulfilling the request. In one example, the expiration describes the amount of time remaining before the access token expires. In another example, the expiration describes an amount of data that can be transferred before access to the service is terminated. When a client sends a request and a limited access token to the service provider 204, the service provider 204 provides the requested service, and also updates data contained in the limited access token to reflect changes in the expiration of the token. In one example, the expiration of the token includes a data transfer quota. When the client requests a data transfer operation from the service provider 204, the service provider 204 performs the data transfer operation, and updates the amount of data transfer remaining for the limited access token. The updated limited access token is resigned or reencrypted and then returned to the client for use in additional requests. In at least one implementation, the policy module 218 maintains information in the access history database 222 so that a particular client cannot regain limited access by reusing the same limited access policy.

In an embodiment, access history database 222 contains information that allows the policy module 218 to track the usage of the service provider by various clients or entities. For example, access history database 222 is used in some implementations to evaluate whether limitations associated with limited access policies have been violated by particular service requests. Access history database 222 accomplishes this by maintaining information that permits the policy module 218 to calculate the total service usage by an entity permitted by a particular limited access policy, the timing of requests made by an entity, the number of requests made by an entity, or any other metric used as the basis for a limitation in a limited access policy. Access history database 222 can be expanded to record any property used to form a limitation, or pruned for performance reasons when a particular historical information is not used in any currently active limited access policy.

In some implementations, when a client requests access from a service provider 204 using a limited access token, the limited access token is upgraded to a non-limited access token. For example, when the administrator of the service provider modifies non-limited access policies to include clients previously subject to limited access policies, the limited access token provided with an access request by the previously limited clients is exchanged with a non-limited access token. The non-limited access token is returned to the client, thereby removing the limitations of the limited access policy.

Figure 3:
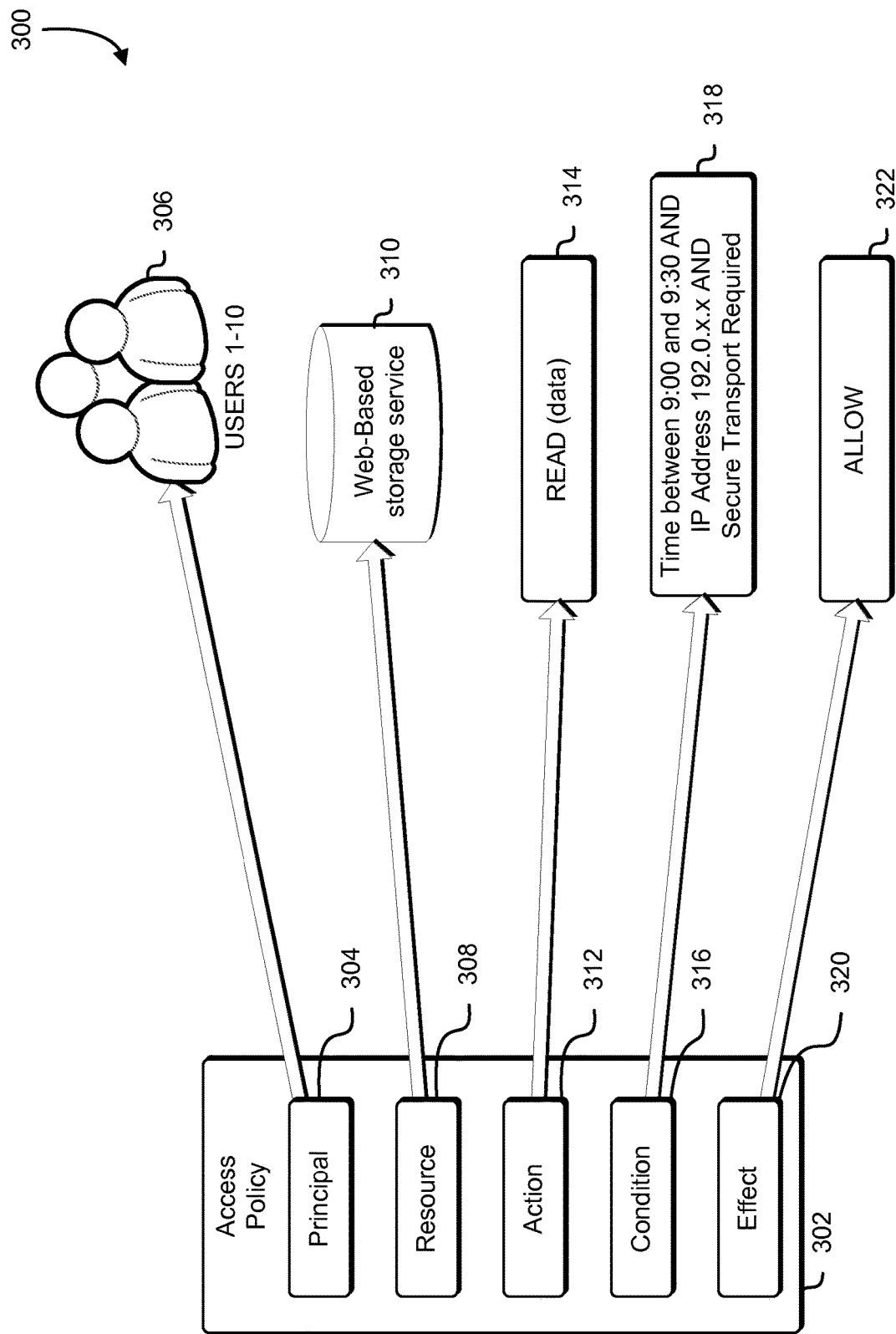
FIG. 3 shows an illustrative example of an access policy in accordance with an embodiment.

FIG. 3 shows an illustrative example of an access policy in accordance with an embodiment. A data diagram 300 illustrates an access-policy data structure 302, data fields associated with the access-policy data structure 302, and example values for each data field. Access-policy data structure 302 includes a principal data field 304. The principal data field 304 contains information that identifies a person, group, computer, role, or other entity to which a particular access policy applies. As an example, the principal data field 304 is shown as specifying a group of users 306. A resource data field 308 specifies a particular resource or group of resources to which the particular access policy applies. As an example, the resource data field 308 is shown as specifying a web-based storage service 310. An action data field 312 identifies the particular operation or action that the particular access policy controls. As an example, the action data field 312 is shown specifying a data read action 314. A condition data field 316 defines logical conditions that apply to the access policy. In some instances, a particular access policy will have an empty condition data field 316. When the particular access policy has an empty condition data field 316, the condition is deemed satisfied, and the particular access policy always applies. In additional instances, a particular access policy has a condition data field 316 that includes multiple logical terms, and each term is combined with additional terms using logical operations. For example, in the data diagram 300, the condition data field 316 is shown having a particular condition 318 that requires that the time be between 9:00 and 9:30, and that the client IP address match 192.0.X.X, and the client use a secure transport. Effect data field 320 defines how the access policy affects the associated action. In data diagram 300, the effect data field 320 is set to a value of allow 322, therefore the access policy defines when users 1-10 are permitted read access to a web-based storage service. Negative access policies can be created by setting the effect data field 320 to a deny value.

Figure 4:
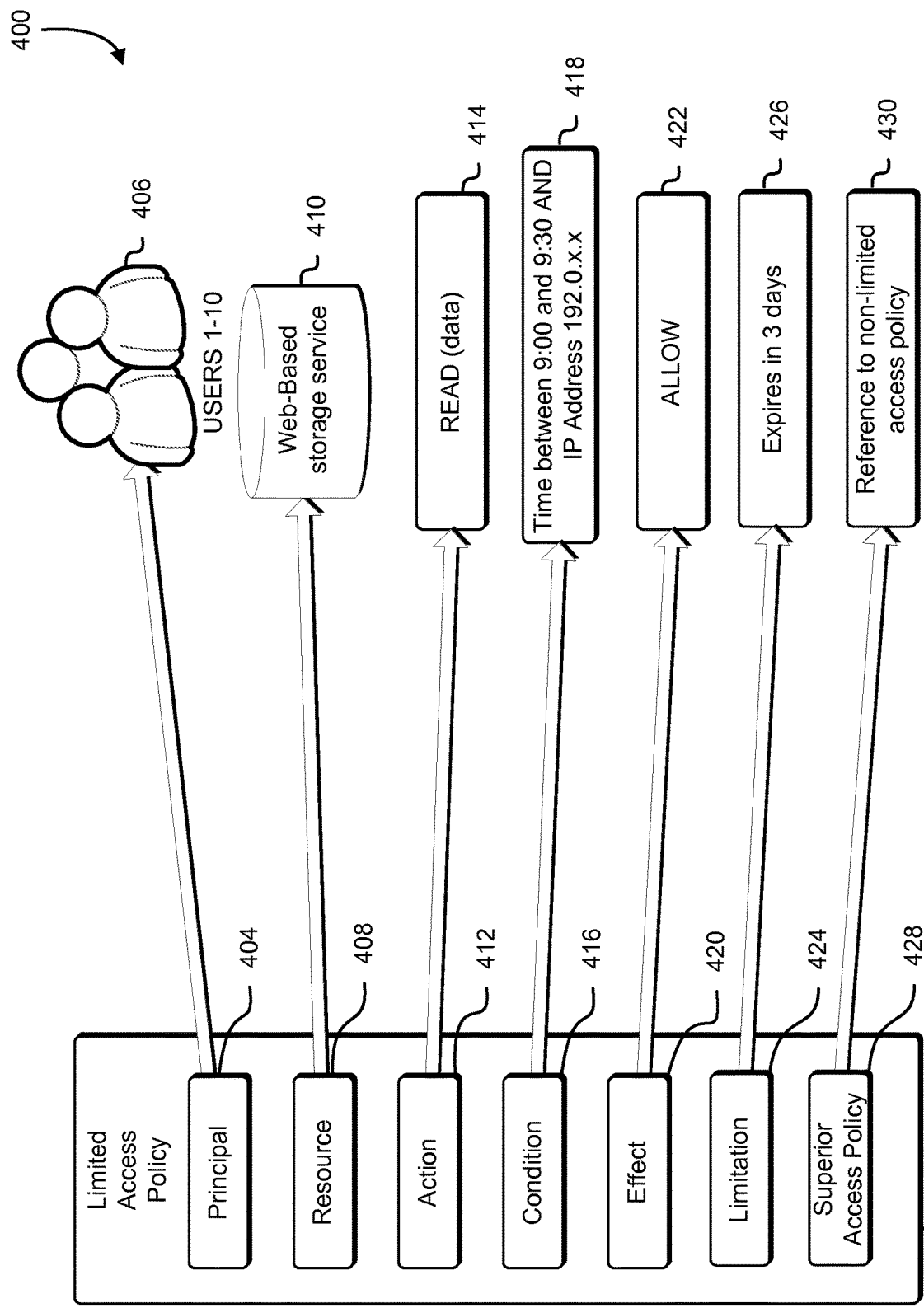
FIG. 4 shows an illustrative example of a limited access policy in accordance with an embodiment.

FIG. 4 shows an illustrative example of a limited access policy in accordance with an embodiment. A data diagram 400 illustrates a limited-access-policy data structure 402, data fields associated with the limited-access-policy data structure 402, and example values for each data field. The limited-access-policy data structure 402 includes a principal data field 404. The principal data field 404 contains information that identifies a person, group, computer, role, or additional entity to which a limited access policy applies. As an example, the principal data field 404 is shown as specifying a group of users 406. A resource data field 408 specifies a particular resource or group of resources to which the limited access policy applies. As an example, the resource data field 408 is shown as specifying a web-based storage service 410. An action data field 412 identifies the particular operation or action that the limited access policy controls. In various implementations, allowable values for the action data field 412 include read, write, update, execute, list, administer, and delete. As an example, the action data field 412 is shown specifying a data read action 414. The condition data field 416 defines logical conditions that apply to the limited access policy. In some instances, a particular limited access policy will have an empty condition data field 416. When a particular limited access policy has an empty condition data field 416, the particular limited access policy always applies. In certain instances, a particular limited access policy has a condition data field 416 that includes multiple logical terms, and each term is combined with additional terms using logical operations. For example, in the data diagram 400, the condition data field 416 is shown having a particular condition 418 that requires that the time be between 9:00 and 9:30, and requires the client IP address match 192.0.X.X. An effect data field 420 defines how the limited access policy affects the associated action. In the data diagram 400, the effect data field 420 is set to a value of allow 422, therefore the limited access policy defines when users 1-10 are permitted read access to a web-based storage service. Negative limited access policies can be created by setting the effect data field 420 to a deny value.

In certain implementations, the limited-access-policy data structure is used to define limited access policies with various constraints on the rights granted to a specified principal. For example, the resource data field 408 can be used to limit access based on a data classification by granting access to only public data when the limited access policy is used, and a linked superior non-limited access policy can grant access to private and public data. In another example, the action data field 412 can be used to block data modification to stored data when limited access is granted, and the linked superior access policy can grant both read and write access to the stored data. In additional implementations, additional data classifications are used to constrain access granted by a limited access policy such as a type of the data, freshness of the data, source of the data, or creator of the data, In yet another implementation, resource tags that are associated with the resource specified by resource data field 408 are used to limit the access granted by a limited access policy.

The limited-access-policy data structure 402 includes a limitation data field 424 that, in certain implementations, distinguishes the limited-access-policy data structure 402 from the access-policy data structure 302. Information contained in limitation data field 424 defines the extent of the limitation placed on the limited access policy. The limitation can be based at least in part on an amount of elapsed time, resources consumed by the client, number of service requests by the client, or other measurable resources such as noted above. For example, in some implementations, the limitation data field 424 defines an amount of time from when access is granted until when access expires. In another implementation, the limitation data field 424 defines an initial resource quota granted to a client when access is first granted to a service. In the data diagram 400, the limitation data field 424 is shown having an example limitation value 426 that represents a three-day expiration. In yet another implementation, the limitation data field 424 defines a specific time or resource status that causes access to be terminated. In some implementations, the limitation data field 424 restricts the communication channels used by the requesting client. For example, the requesting client may be limited to the use of secure transport protocols. In another example, the requesting client may be limited to the use of a particular IP address range. In yet another example, the requesting client may be limited by granting access to the service only when the load on the service is below a threshold value.

In certain implementations, the limited-access-policy data structure 402 includes a superior-access-policy data field 428. The superior-access-policy data field 428 references an associated access policy that provides access rights superior to those provided by the limited access policy. In some instances, the superior-access-policy data field 428 references a non-limited access policy. In another instance, the superior-access-policy data field 428 references another limited access policy. By examining the condition data field associated with the access policy referenced by the superior-access-policy data field and determining the elements of the condition that are not satisfied, the service provider can communicate to the client a reason for limiting the client's access to the service. As a result, the client is informed as to how the client can, in some situations, modify access parameters, access methods, or additional variables to secure non-limited access.

In certain implementations, when a particular client is granted access to the service, the authorization module issues an access token to the particular client. Access tokens that issue as a result of a non-limited access policy permitting access are non-limited access tokens. Access tokens that issue as a result of a limited access policy permitting access are limited access tokens. In some implementations, after the particular client is provided with an access token, further access to the service is facilitated by providing the previously issued access token with the new request. The previously issued access token is authorized, authenticated, updated, and returned to the particular client.

In some implementations, access tokens are digitally signed or encrypted with a cryptographic key known to the service provider. The cryptographic key can be symmetric or asymmetric. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRU-Encrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 5:
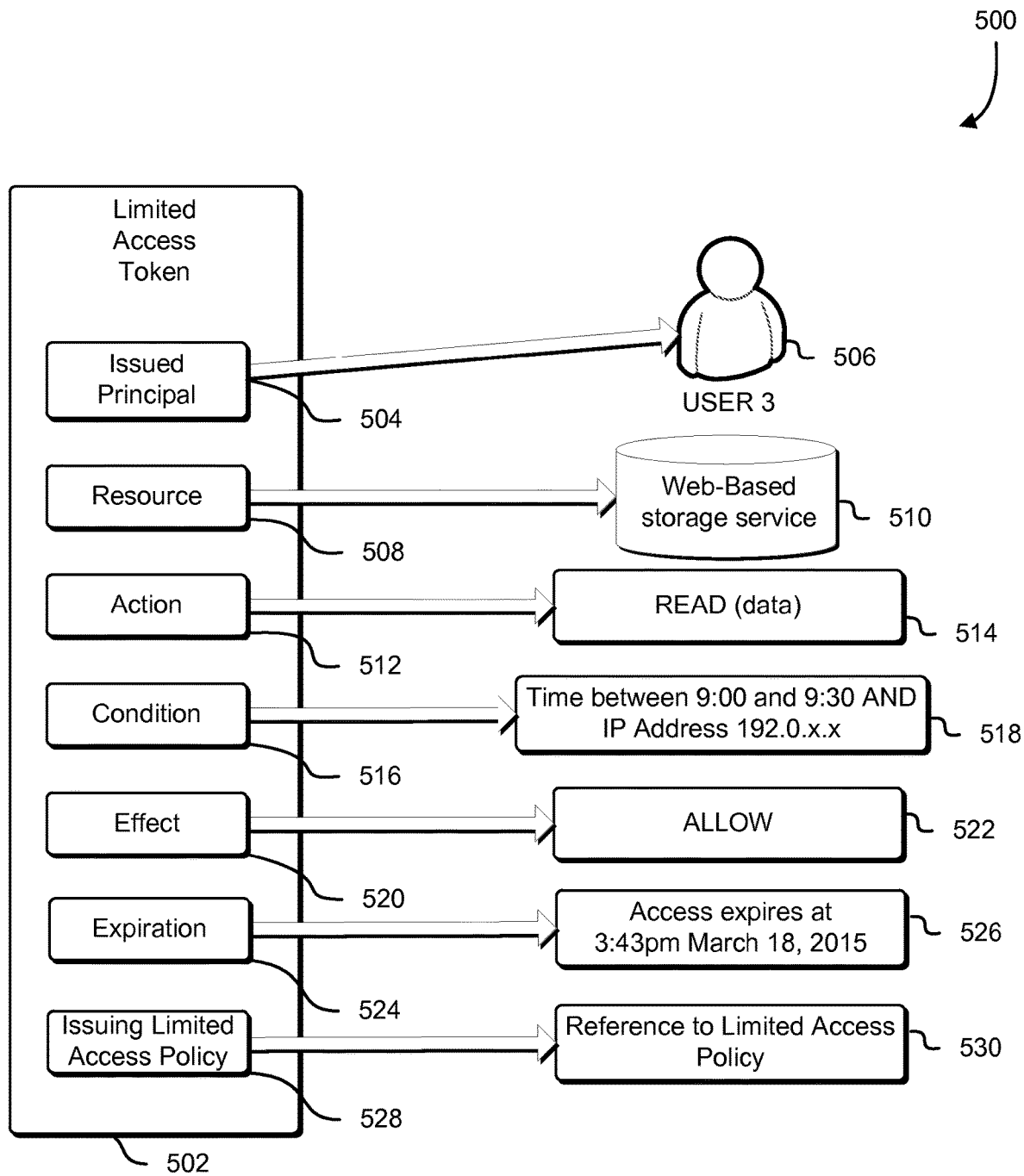
FIG. 5 shows an illustrative example of a limited access token in accordance with an embodiment.

FIG. 5 shows an illustrative example of a limited access token in accordance with an embodiment. A data diagram 500 shows a limited-access-token data structure 502, a number of data fields contained in the limited-access-token data structure 502, and an example data value for each data field. The limited-access-token data structure 502 includes an issued-principal data field 504. The issued-principal data field 504 contains information that identifies the particular person, group, computer, role, or other entity to which a limited access token applies. As an example, the issued-principal data field 504 is shown as specifying a particular user 506 (USER 3). A resource data field 508 specifies a particular resource or group of resources to which the access policy applies. As an example, the resource data field 508 is shown as specifying a particular web-based storage service 510. An action data field 512 identifies the particular operation or action that the limited access token controls. In various implementations, allowable values for the action data field 512 include read, write, update, execute, list, administer, and delete. As an example, the action data field 512 is shown specifying a data read action 514. Condition data field 516 defines logical conditions that apply to the limited access token. In some instances, a particular limited access token will have an empty condition data field 516. When a particular limited access token has an empty condition data field 516, the condition is deemed satisfied (true). In other instances, a particular limited access token has a condition data field 516 that includes multiple logical terms, and each term is combined with additional terms using logical operations. For example, in data diagram 500, condition data field 516 is shown having a condition 518 that requires that the time be between 9:00 and 9:30, and requires that the client IP address match 192.0.X.X. Effect data field 520 defines how the limited access token affects the associated action. In data diagram 500, the effect data field 520 is set to a value of allow 522, therefore the limited access token grants users 1-10 read access to a web-based storage service.

The limited-access-token data structure 502 includes an expiration data field 524 that, in certain implementations, distinguishes a limited-access-token data structure 402 from non-limited access tokens. Information contained in the expiration data field 524 defines a remaining limitation on the access right. The expiration can be calculated based at least in part on the same measurable resources used to establish the limitation of the limited access policy. For example, expiration can be calculated based at least in part on processing cycles, memory use, disk storage, data transfer, network bandwidth, power usage, cooling capacity, battery usage, and memory-write cycles. In some implementations, the expiration data field 524 defines the time remaining before the access expires. In another implementation, the expiration data field 524 defines a remainder of a quota that can be used by the client. In the data diagram 500, the expiration data field 524 is shown having an example expiration value 526 of 4:43 pm, Mar. 18, 2015.

In certain implementations, the limited-access-token data structure 502 includes an issuing-limited-access-policy data field 528. The issuing-limited-access-policy data field 528 references a particular limited access policy 530 that was used as a basis for issuing the limited access token. In some implementations, the issuing-limited-access-policy data field 528 is used to update non-expired limited access tokens when their associated limited access policies are changed. For example, the administrator of a service provider may determine that a particular limited access policy represents an unacceptable security risk, and as a result, removes the particular limited access policy. When the particular limited access policy is removed, the authorization module uses the issuing-limited-access-policy data field to identify limited access tokens that were issued based at least in part on the removed limited access policy. The identified limited access tokens are invalidated by the authorization module by updating information in an access history database managed by a policy module. In another implementation, the issuing-limited-access-policy data field 528 is used to identify a limited access policy that granted a particular limited access token and a superior non-limited access policy associated with the limited access policy. The conditions of the superior non-limited access policy can be used to determine a reason that the client was not permitted non-limited access.

Figure 6:
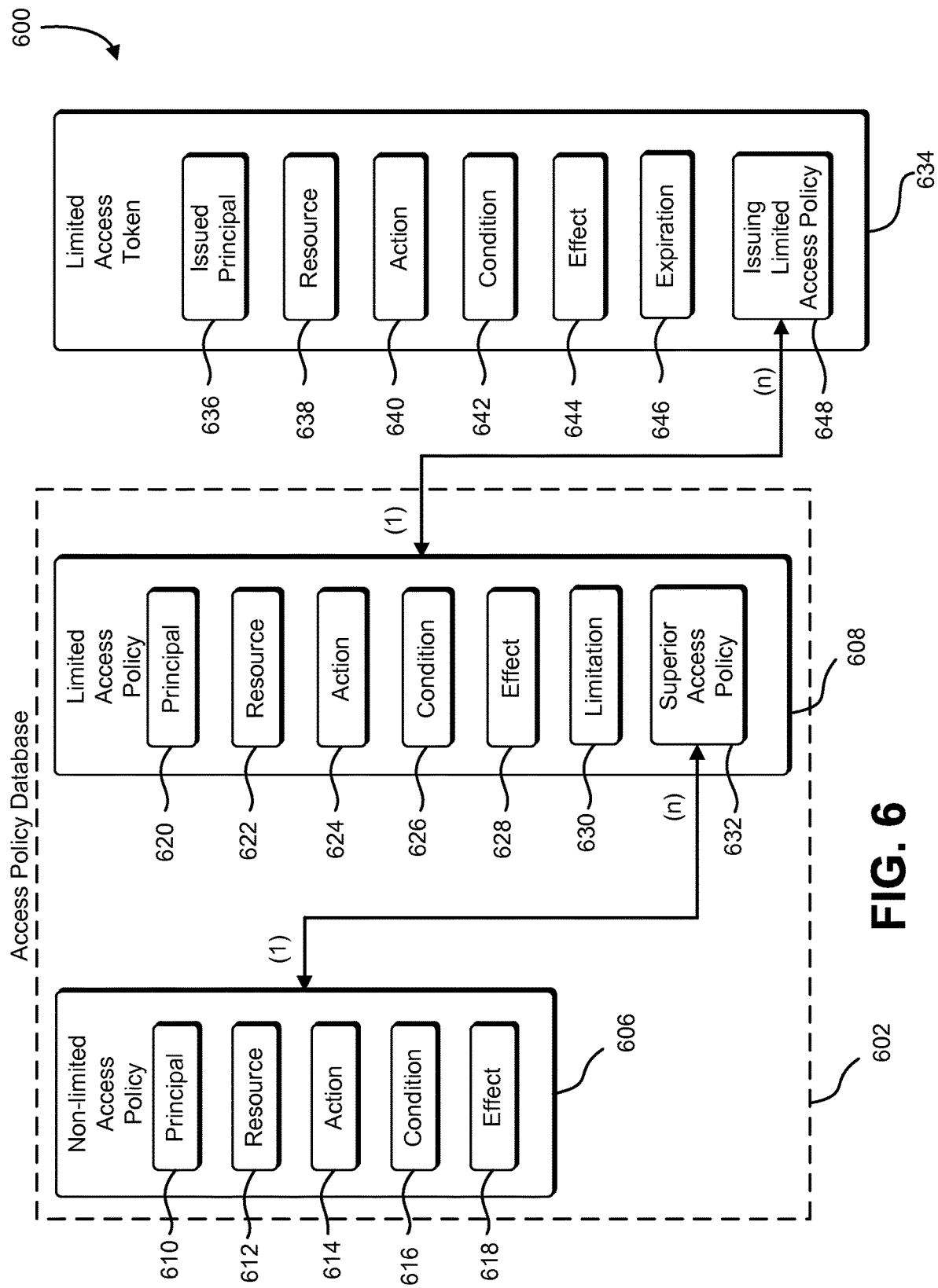
FIG. 6 shows an illustrative example of a data architecture that retains access policies and access tokens in accordance with an embodiment.

FIG. 6 shows an illustrative example of a data architecture that retains access policies and access tokens in accordance with an embodiment. A data architecture diagram 600 shows an access policy database 602 that includes non-limited-access-policy records 606 and limited-access-policy records 608.

Each non-limited-access-policy record 606 includes a number of data fields that describe a non-limited access policy. A principal data field 610 contains information that identifies a person, group, computer, role, or other entity to which the associated non-limited access policy applies. A resource data field 612 specifies a particular resource or group of resources to which the associated non-limited access policy applies. An action data field 614 identifies a particular operation or action that the associated non-limited access policy controls. A condition data field 616 defines logical conditions that apply to the associated non-limited access policy, and an effect data field 618 defines how the associated non-limited access policy affects the particular operation or action.

Each limited-access-policy record 608 includes a number of data fields that describe a limited access policy. A principal data field 620 contains information that identifies a person, group, computer, role, or other entity to which the associated limited access policy applies. A resource data field 622 specifies a particular resource or group of resources to which the associated limited access policy applies. An action data field 624 identifies a particular operation or action that the associated limited access policy controls. A condition data field 626 defines logical conditions that apply to the associated limited access policy, and an effect data field 628 defines how the associated limited access policy affects the particular operation or action. A limitation data field 630 describes the extent of the limitation placed on the limited access policy. A superior-access-policy data field 632 references a non-limited access policy that provides access rights superior to those provided by the limited access policy. In one implementation, the superior-access-policy data field 632 references zero or one non-limited-access-policy records. When the superior-access-policy data field 632 references a non-limited-access-policy record, the non-limited-access-policy record describes a non-limited access policy that provides upgraded non-expiring access rights to the service. In another implementation, the superior-access-policy data field 632 references a second limited-access-policy record. The second limited-access-policy record can, in turn, reference additional limited or non-limited access policies, creating a chain of alternative possible access policies. In some implementations, a particular non-limited access policy is referenced by multiple limited access policies.

A limited-access-token record 634 describes a limited access token and includes a number of data fields. An issued-principal data field 636 contains information that identifies the particular person, group, computer, role, or other entity to which the limited access token applies. A resource data field 638 specifies a particular resource or group of resources to which the access policy applies. An action data field 640 identifies the particular operation or action that limited access token controls. A condition data field 642 defines logical conditions that apply to the limited access token. An effect data field 644 defines how the limited access token affects the particular operation or action. An expiration data field 646 defines when the limited access token expires. An issuing-limited-access-policy data field 648 references a particular limited-access-policy record 608 that was used as a basis for issuing the limited access token. In some implementations, a particular limited access policy is referenced by multiple limited access tokens. Non-limited-access-token records contain an issuing-non-limited-access-policy field that references a non-limited access policy.

Figure 7:
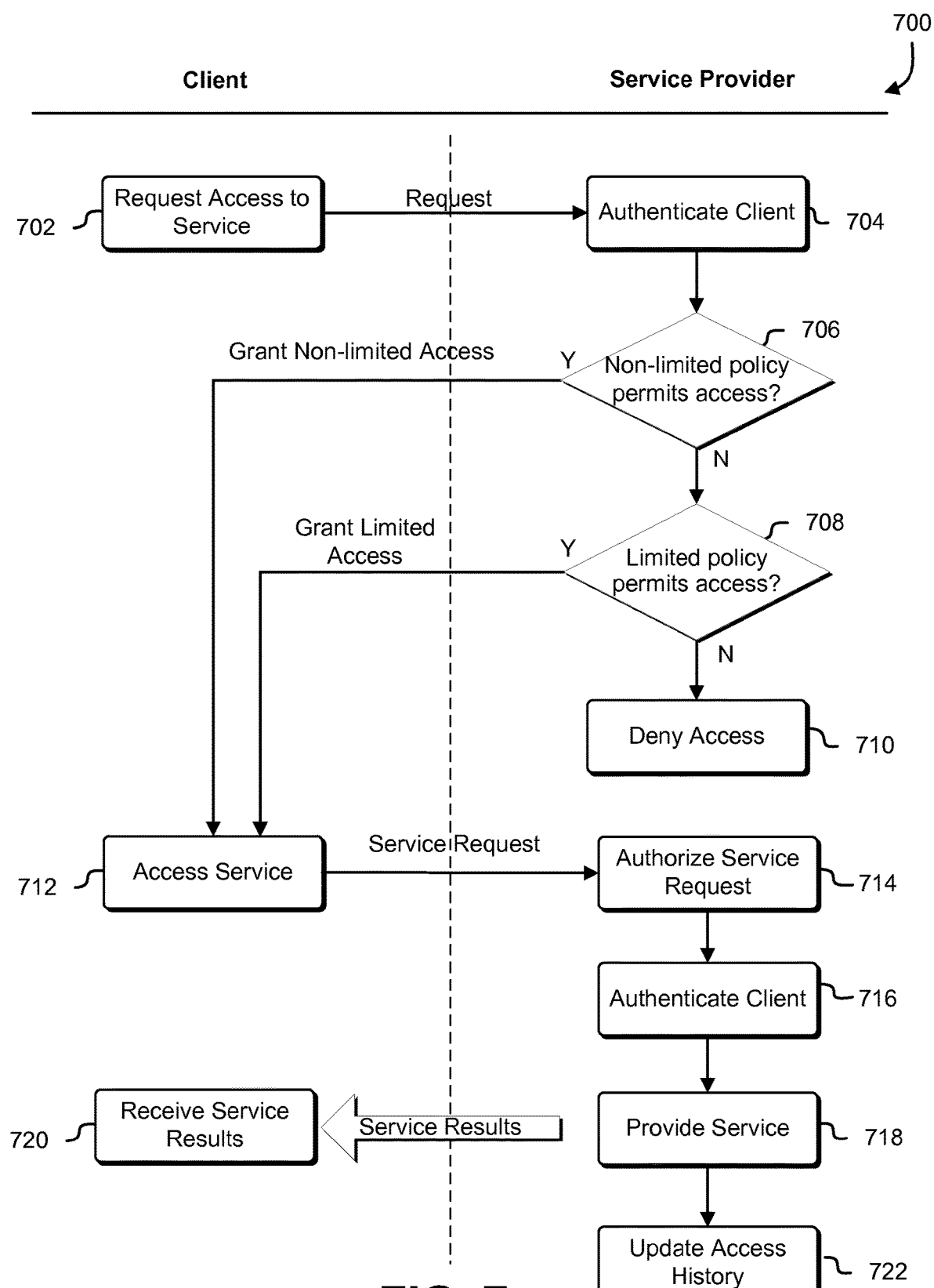
FIG. 7 shows an illustrative example of a process that, when performed, authorizes access to a service provider, and processes service requests using an access token, in accordance with an embodiment.

FIG. 7 shows an illustrative example of a process that, when performed, authorizes access to a service provider, and processes service requests, in accordance with an embodiment. A process diagram 700 illustrates a process where access to a service is negotiated between a client and a service provider. The client requests access to the service at block 702. When the service provider receives the access request at block 704, the service provider authenticates the client. The process of authentication produces verified identifying information such as, in some implementations, information associated with the connection used to access the service, a user ID, a type or category of the client, and any groups or roles associated with the client. The verified identifying information is used to identify policies that are applicable to the client. At block 706, the service provider queries an access-policy database and determines, based at least in part on the verified identifying information, whether a non-limited access policy permits access to the client. When a non-limited access policy permits the requested level of access to the service, the granted level of access is communicated to the client. In some implementations, when a non-limited access policy permits access to the client, the service provider generates a non-limited access token based at least in part on the applicable non-limited access policy, and returns the non-limited access token to the client.

When a non-limited access policy does not permit access to the client, the service provider determines, at block 708, whether a limited access policy permits access to the client. When a limited access policy permits limited access to the service, the limited access grant is communicated to the client. In some implementations, when a limited access policy permits access to the client, the service provider generates a limited access token based at least in part on the limited access policy, and returns the limited access token to the client. When neither a non-limited access policy nor a limited access policy permits access to the client, execution proceeds to block 710 where access to the service is denied. When access to the service is denied, in some implementations, an access token is not returned to the client, or an access token indicating that access is denied is returned to the client. In some implementations, the service provider digitally signs issued access tokens using a private key of an asymmetric private-public key pair that is known to the service provider.

In implementations where an access token is not issued to the client, the client is notified of the granted level of access by the service provider at block 712, and forms a service request that is issued to the service provider. At block 714, the service provider receives and authorizes the request using a policy module.

In an embodiment, the policy module determines whether a request is authorized by using information stored in an access history database and an access policy database. The access history database retains information that describes the service requests made by each client, the services provided to each client, and the access policies used to grant each service request. When a request is received from a client, the policy module identifies the access policy that permits the request to be fulfilled. If the policy that permits the request to be fulfilled is a limited access policy, the access history database is queried to determine if the client has exceeded the limitation of the limited access policy. For example, when the limited access policy has a limitation where access is limited to 3 days, the access history database is queried to determine when the client was first granted access by the limited access policy. When the first grant is less than three days old, the current request is permitted by the limited access policy. When the first grant is more than three days old, the current request is denied by the limited access policy. When there is not a first grant recorded in the access history database, the current request is the first request from the client that is permitted by the limited access policy, and the current request is permitted. In another example, when the limited access policy has a limitation where the amount of data transferred is limited to 1 GB, the access history database is queried to determine the amount of data transferred by the client using requests permitted by the limited access policy. When the amount of data transferred is less than 1 GB, or there has been no data transferred previously, the current request is permitted by the limited access policy. When the amount of data transferred is greater than 1 GB, the current request is denied by the limited access policy.

In another embodiment, the policy module determines whether a request is authorized by using information maintained in a flag associated with the policy that permits the request. Each policy record in the access policy database includes a flag that records the entities that have been granted access to the service by obtaining permission from the particular policy. For example, when a particular limited access policy permits a service request, the flag associated with a particular limited access policy contains information indicating when the client first submitted a request that was granted using the particular limited access policy, the amount of services consumed by the client under the particular limited access policy, and the number of requests made by the client under the particular limited access policy.

Using this information, the policy module can detect when a limitation imposed by the particular limited access policy has been exceeded.

The service provider then authenticates 716 the identity of the client using identifying information provided with the request. When authorization and authentication are successful, execution proceeds to block 718, where service is provided to the client. At block 720, the client receives the results of the request. When service is provided, the access history database is updated 722 to record the service provided, the client, and the policy that granted the service. For example, if the client requests and is provided with 1 MB of data storage, the service provider will record that 1 MB of storage was provided to the client by a particular access policy. The information stored in the access history database is used at least in part to identify when limited access expires, and to identify when limited access policies cannot be reused. In some implementations, only access that is granted by limited access policies is recorded.

In implementations where an access token is issued to the client, the client is notified of the granted level of access by the service provider at block 712, and forms a service request. The client provides the access token along with the request to the service provider. At block 714, the service provider receives and authorizes the request using information contained in the access token. The service provider confirms that the access token defines sufficient rights to permit the request for resources. When the access token is a limited access token, the service provider confirms that the amount of resources requested is less than the amount of resources specified by the expiration of the limited access token. The request is authenticated 716 by verifying the digital signature of the access token. When the request for resources is valid, execution proceeds to block 718, and service is provided to the client. At block 720, the client receives the service results along with an updated access token. When the access token provided by the client is a limited access token, the expiration associated with the limited access token is updated to reflect the amount of resources used by the client's request. For example, if the client requests 1 MB of data storage, and provides a limited access token with an expiration of 5 MB, the service provider will subtract 1 MB from the expiration of the limited access token leaving an expiration of 4 MB. In some implementations, the updated limited access token is re-signed by the service provider before the updated limited access token is returned to the client. In certain implementations, non-limited access tokens are not updated. At block 722, the access history database is updated to record the service provided to the client.

In particular implementations where the service provider utilizes multiple backend servers, a central authorization server maintains an authoritative access policy database. Access tokens are issued to clients by the authorization server in response to access requests by the clients. Each access token is signed using a cryptographic key known to the service provider. When clients request resources, the clients provide their issued access token with the request. The access token is validated by the service provider, and valid requests are dispatched to the resource servers using a load balancer. When the access token used by a particular client is a limited access token, the access token is updated to indicate any reduction in resource quota or expiration time, and the updated token is returned to the particular client. A central access history database is maintained by the authorization server. In one implementation, the access token is cryptographically signed using a cryptographic key known to the service provider. When the particular client later requests access to the service, the particular client provides the access token along with the request. The resource server uses the signed access token to determine whether access to the service was previously authorized, and when the request was previously authorized, provides the requested access to the resource without querying the authorization server.

Figure 8:
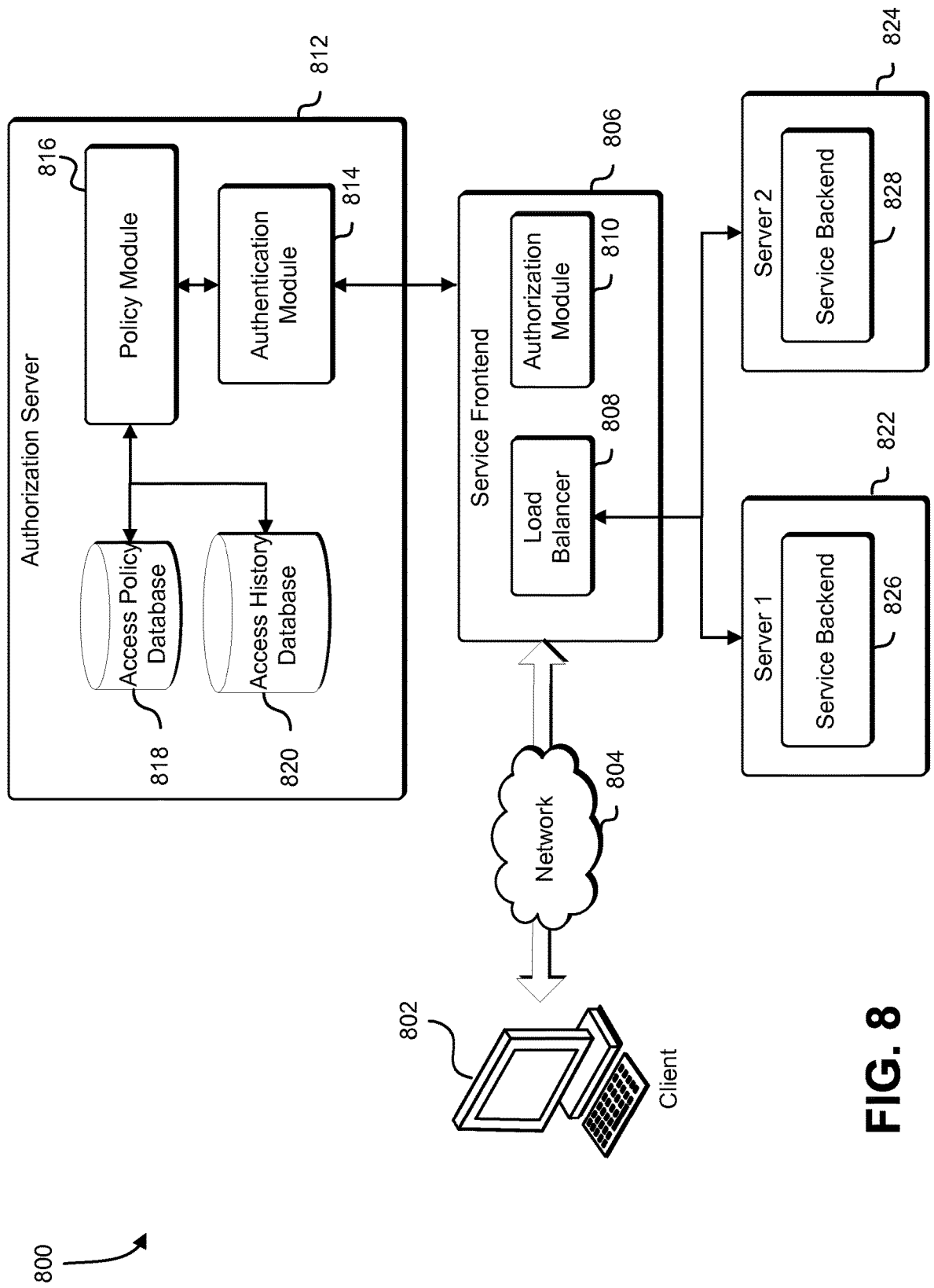
FIG. 8 shows an illustrative example of a service provider that includes a plurality of resource servers, where access controls are administered by an authorization server, in accordance with an embodiment.

FIG. 8 shows an illustrative example of a service provider that includes a plurality of resource servers, where access controls are administered by an authorization server, in accordance with an embodiment. In a block diagram 800, a client 802 accesses a service provider via a computer network 804. The service provider has a service frontend 806 that includes a load balancer 808 and an authorization module 810. The load balancer 808 distributes requests for resources to a plurality of resource servers 822, 824. The authorization module 810 authorizes requests from the client 802 and forwards the requests to an authorization server 812. The authorization server 812 includes an authentication module 814 that confirms the identity of the client. The authentication module 814 queries a policy module 816, and based at least in part on the identity of the client and the content of the request, the policy module 816 identifies applicable access policies from a database of access policies 818. The policy module 816 creates an appropriate access token based at least in part on the identified applicable access policies. In one implementation, when a non-limited access policy is identified, the policy module 816 creates a non-limited access token. When no non-limited access policy permits the requested access and a limited access policy does permit the requested level of access, the policy module 816 creates a limited access token. The created access token is returned by the authorization server 812 to the service frontend, and is issued to the client 802.

When the client 802 makes an additional request to the service provider, the client 802 provides the issued access token with the additional request. In one implementation, the issued access token is returned to the authorization server 812, where the issued access token is used, at least in part, to validate and authorize the request. In another implementation, the issued access token is validated by the service frontend 806 before the request is forwarded through the load balancer 808. The load balancer 808 forwards requests to a plurality of resource servers 822, 824. Each resource server includes a service backend 826, 828 that provides requested services to the client 802.

Figure 9:
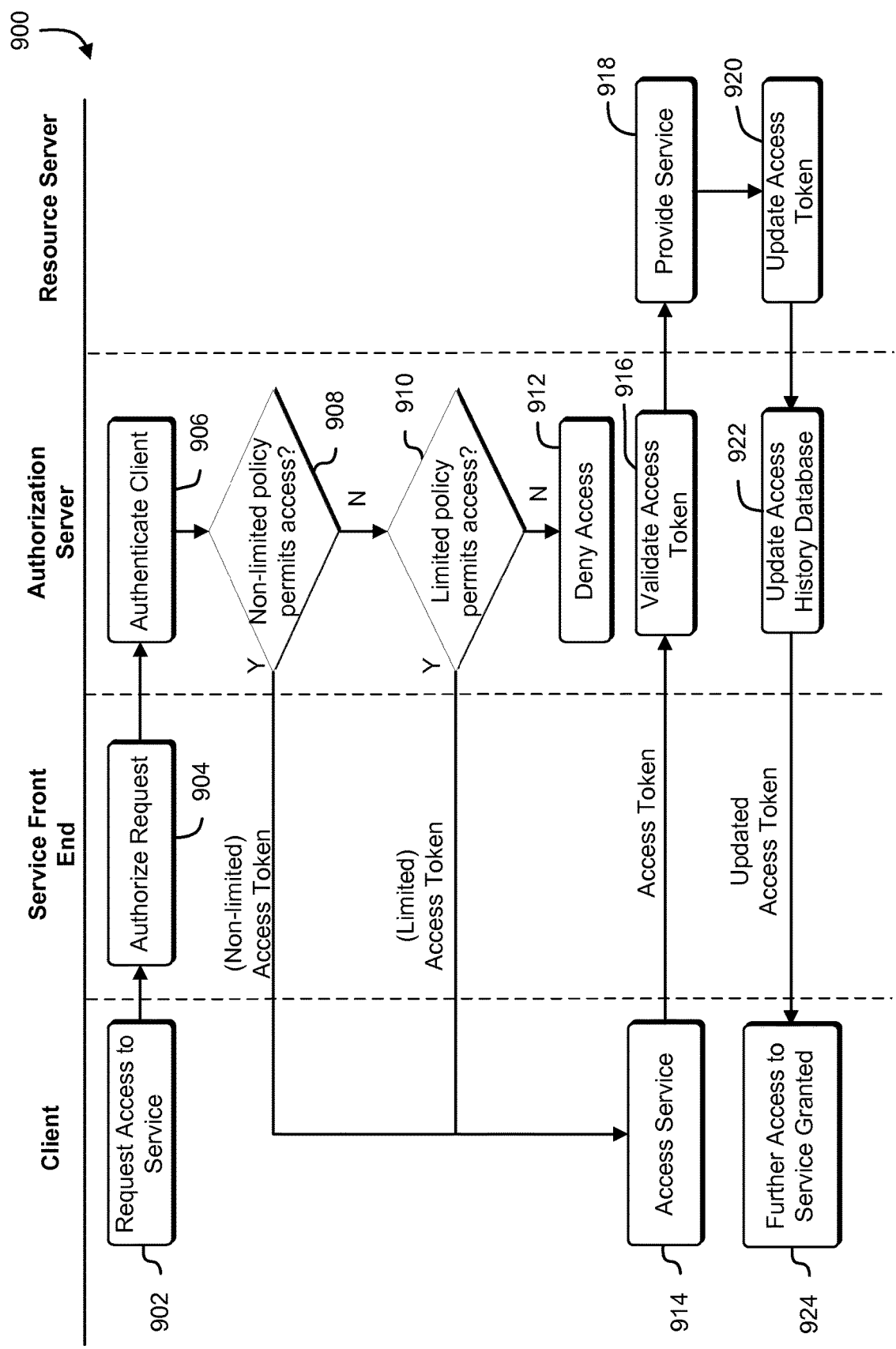
FIG. 9 shows an illustrative example of a process that, when performed, authorizes access to a service provider, and distributes authorized requests to a plurality of resource servers, in accordance with an embodiment.

FIG. 9 shows an illustrative example of a process that, when performed, authorizes access to a service provider, and distributes authorized requests to a plurality of resource servers, in accordance with an embodiment. In a process diagram 900, a client requests resources from a service provider that includes a service frontend, an authorization server, and a resource server. At block 902, a client sends a request for access to a service. The service frontend receives and authorizes 904 the request. At block 906, the authorization server determines whether the client is authentic based at least in part on identifying information provided by the client. When the authorization server determines 908 that a non-limited access policy permits the requested level of access, the authorization module issues a non-limited access token to the client. When the authorization module determines 910 that a limited access policy permits the requested level of access, the authorization module issues a limited access token to the client. When neither a non-limited access policy nor a limited access policy permits the requested level of access, the authorization module denies 912 access to the service. When access to the service is denied, an access token is not issued to the client. In some implementations, when access to the service is denied, an access token is issued to the client that denies access rights.

At block 914, the client receives the access token from the authorization server and forms a request for resources. The client sends the request and the access token to the authorization server. In some implementations, the service frontend acts as a relay for the request and token. The authorization server validates 916 the access token and the request. In some implementations, the access token is validated by confirming a digital signature. In another implementation, when the access token is a limited access token, the request is invalidated if the request would exceed the amount of expiration remaining on the limited access token. The request and the access token are forwarded to the resource server, where the service is provided 918 to the client. At block 920, the access token is updated to reflect the amount of service provided and is then resigned. In some implementations, the request is relayed through a load balancer which distributes requests across a number of resource servers, and each resource server performs the operations of blocks 918 and 920 for requests that are routed to the particular server. The resource server updates 922 an access history database with information relating to the service provided, and then sends the updated access token to the client. In some implementations the access token is relayed through a service frontend. Once the client receives the updated access token, the client can form additional requests 924 for resources.

In another implementation, the tasks associated with validating and maintaining access tokens are performed by the resource servers in coordination with the central authorization server. Client requests for resources are forwarded to the resource servers with the access token provided by the client. The resource servers validate the digital signature of the access token using a cryptographic key known by the service provider. When the access token is determined to be valid, the resource server provides the requested resources, and updates the information in a local access history cache. The local access history cache is periodically synchronized with a central access history database maintained by the central authorization server. By adjusting the interval between cache-synchronization operations, performance of the authorization process is improved while constraining the impact on system security.

Figure 10:
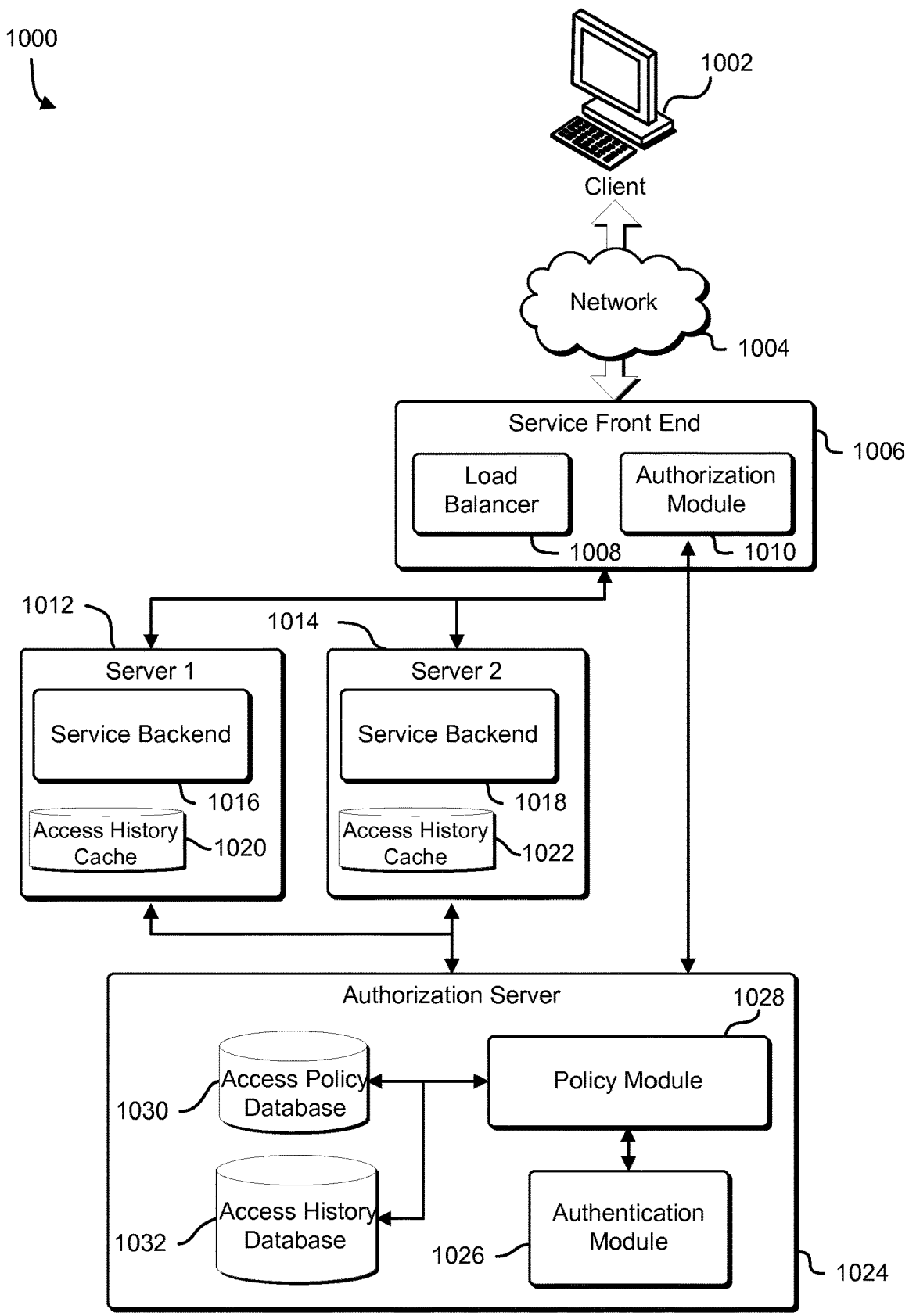
FIG. 10 shows an illustrative example of a service provider that includes a plurality of resource servers, where access controls are administered by a combination of an authorization server and the plurality of resource servers, in accordance with an embodiment.

FIG. 10 shows an illustrative example of a service provider that includes a plurality of resource servers, where access controls are administered by a combination of an authorization server and the plurality of resource servers, in accordance with an embodiment. In a diagram 1000, a client 1002 connects to a service provider over a network 1004. The service provider includes a service frontend 1006. The service frontend 1006 includes a load balancer 1008 and an authorization module 1010. The load balancer 1008 distributes requests for resources to a plurality of resource servers 1012, 1014. Each resource server includes a service backend 1016, 1018 and an access history cache 1020, 1022. An authorization server 1024 is in communication with the service frontend 1006 and the plurality of resource servers 1012, 1014. The authorization server 1024 includes an authentication module 1026 and a policy module 1028. The policy module 1028 maintains an access policy database 1030 and an access history database 1032.

In a particular implementation, the client 1002 initiates a request for resources by sending the request over the network 1004 to the service frontend 1006. The authorization module 1010 authorizes the request and forwards the request information to the authentication module 1026. The authentication module 1026 queries the policy module 1028 to determine applicable access policies and, based at least in part on information in the access policy database, generates an access token. The access token is returned through the service frontend 1006 to the client 1002. When the client 1002 makes additional requests for resources, the client 1002 provides the access token with the request to the service frontend 1006. The service frontend 1006 relays the request and access token through the load balancer 1008. The load balancer 1008 distributes the request and access token to a particular resource server. The particular resource server validates the request based at least in part on the signature and content of the access token. The particular resource server updates the access token, updates the information in the particular resource server's access history cache, and returns the updated token to the client 1002. In some implementations, the particular resource server determines the validity of the request based at least in part on a digital signature. The digital signature may be based at least in part on a symmetric or asymmetric cryptographic key known to the particular resource server.

Information in the particular resource server's access history database is coordinated with additional access history information maintained by the authorization server. In one implementation, an authoritative access history database 1032 is maintained within the authorization server 1024. The authoritative access history database 1032 is periodically synchronized with each access history cache 1020, 1022 within the plurality of resource servers 1012, 1014. Performance of the authorization process can be improved by trading off access-history-update latency by increasing the amount of time between synchronization operations.

Figure 11:
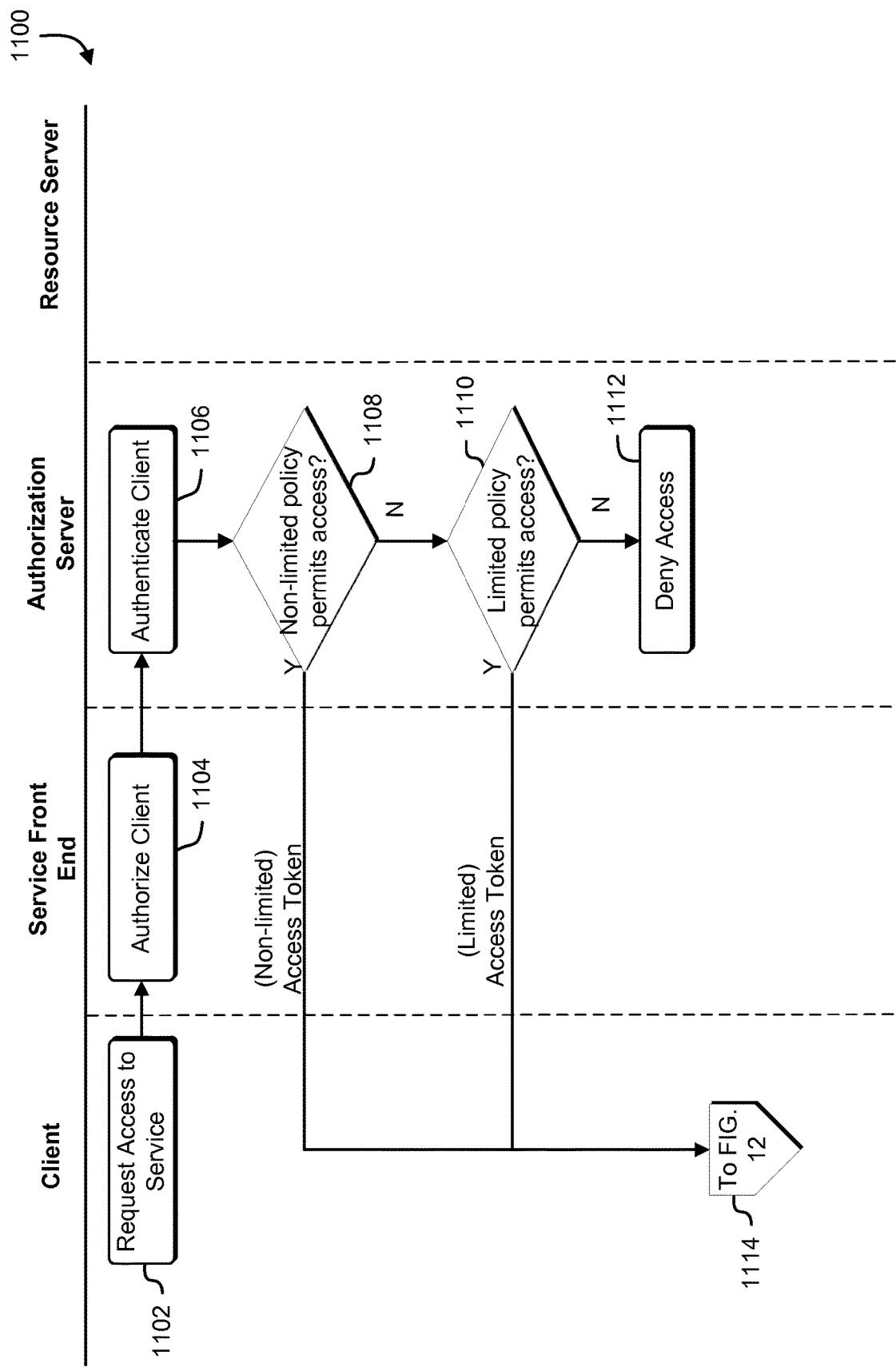
FIGS. 11-12 show an illustrative example of a process that, when performed, authorizes access to a service provider by distributing authorization operations between individual resource servers and an authorization server, in accordance with an embodiment.
Figure 12:
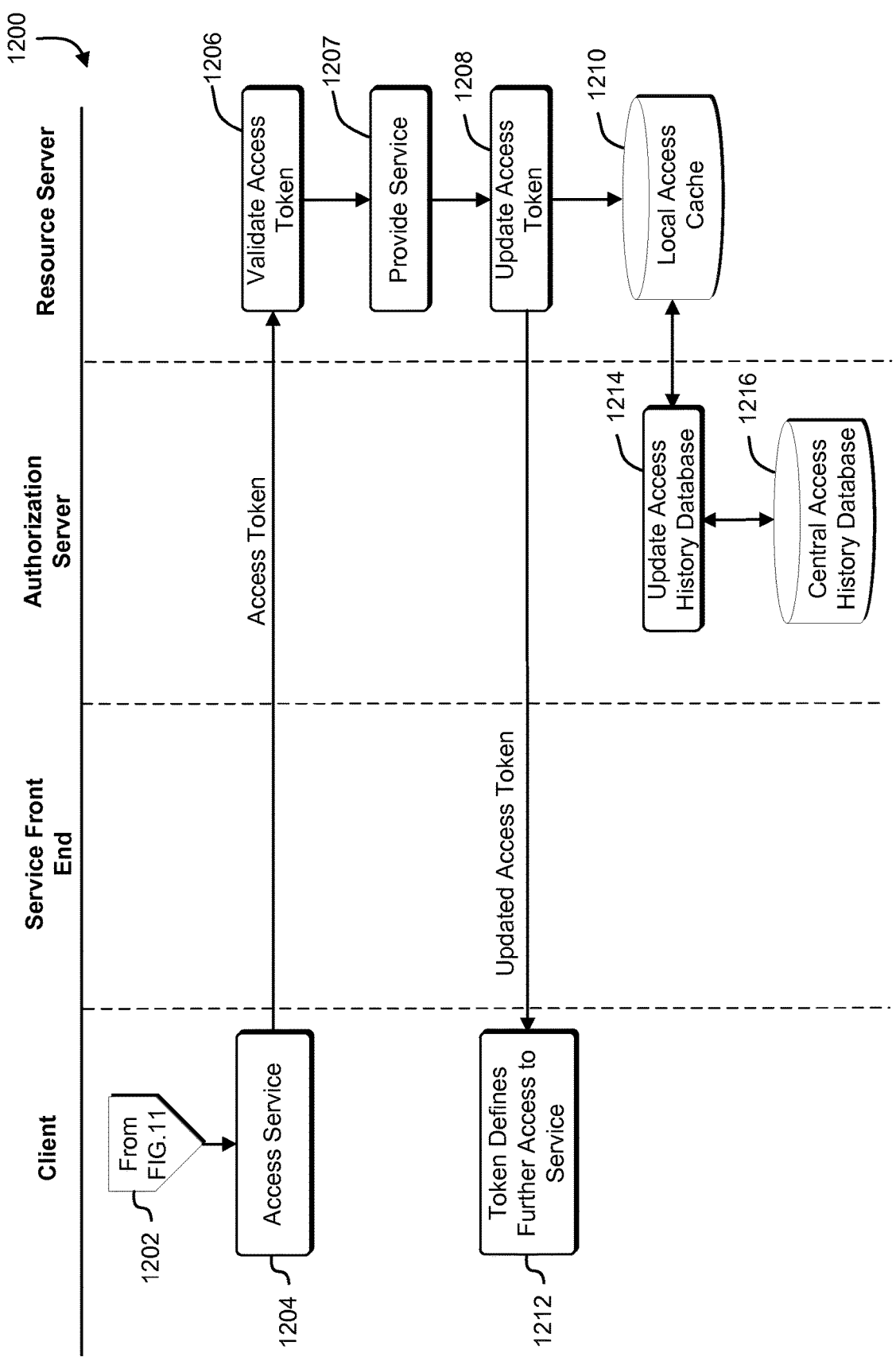

FIGS. 11-12 show an illustrative example of a process that, when performed, authorizes access to a service provider by distributing authorization operations between individual resource servers and an authorization server, in accordance with an embodiment. In a process diagram 1100, a client makes a request to a service provider. The service provider includes a service frontend, an authorization server, and a resource server. At block 1102, the client issues a request for resources to the service frontend. The service frontend authorizes 1104 the client's request based at least in part on an access policy database and forwards the request to the authorization server. The authorization server determines 1106 whether the client is authentic using identifying information provided by the service frontend such as a username and password. When the authorization server determines 1108 that a non-limited access policy permits the requested level of access, the authorization server generates a non-limited access token and returns the non-limited access token to the client. When the authorization server determines 1110 that a limited access policy permits the requested level of access, the authorization server generates a limited access token and returns the limited access token to the client. When neither a non-limited access policy nor a limited access policy permits the requested level of access, the request is denied 112. In some implementations, when the request is denied, an access token is not returned to the client. In another implementation, when the request is denied, an access token that denies rights to resources is returned to the client. The access token is returned to the client and the process diagram 1100 continues on FIG. 12 from a page connector 1114.

In a process diagram 1200, the access token is passed in to a page connector 1202 from FIG. 11. At block 1204, the client generates a service request and transmits the request, along with the access token, to the resource server. The resource server validates 1206 the access token and the request by checking a digital signature of the access token using a cryptographic key known by the service provider, and checking that the access token grants the requested level of access. As a result of the request being valid, the resource server provides 1207 the requested service. At block 1208, the resource server updates the access token to reflect an amount of services used in satisfying the request. The local access history cache 1210 is updated to record the services provided to the client. The updated access token is returned to the client, and is used by the client when making additional requests 1212 for services.

The authorization server merges 1214 the data from the local access history cache 1210 into a central access history database 1216. Once the data from a particular local access history cache is merged into the central history database 1216, the particular local access history cache can be cleared. In one implementation, the authorization server merges the databases periodically. In another implementation, the authorization server merges the databases systematically as updates to either database are made. The periodicity with which the authorization server merges the central access history database 1216 with the local access history databases 1210 can be adjusted to improve system performance while constraining the possibility of clients reusing expired access tokens.

Figure 13:
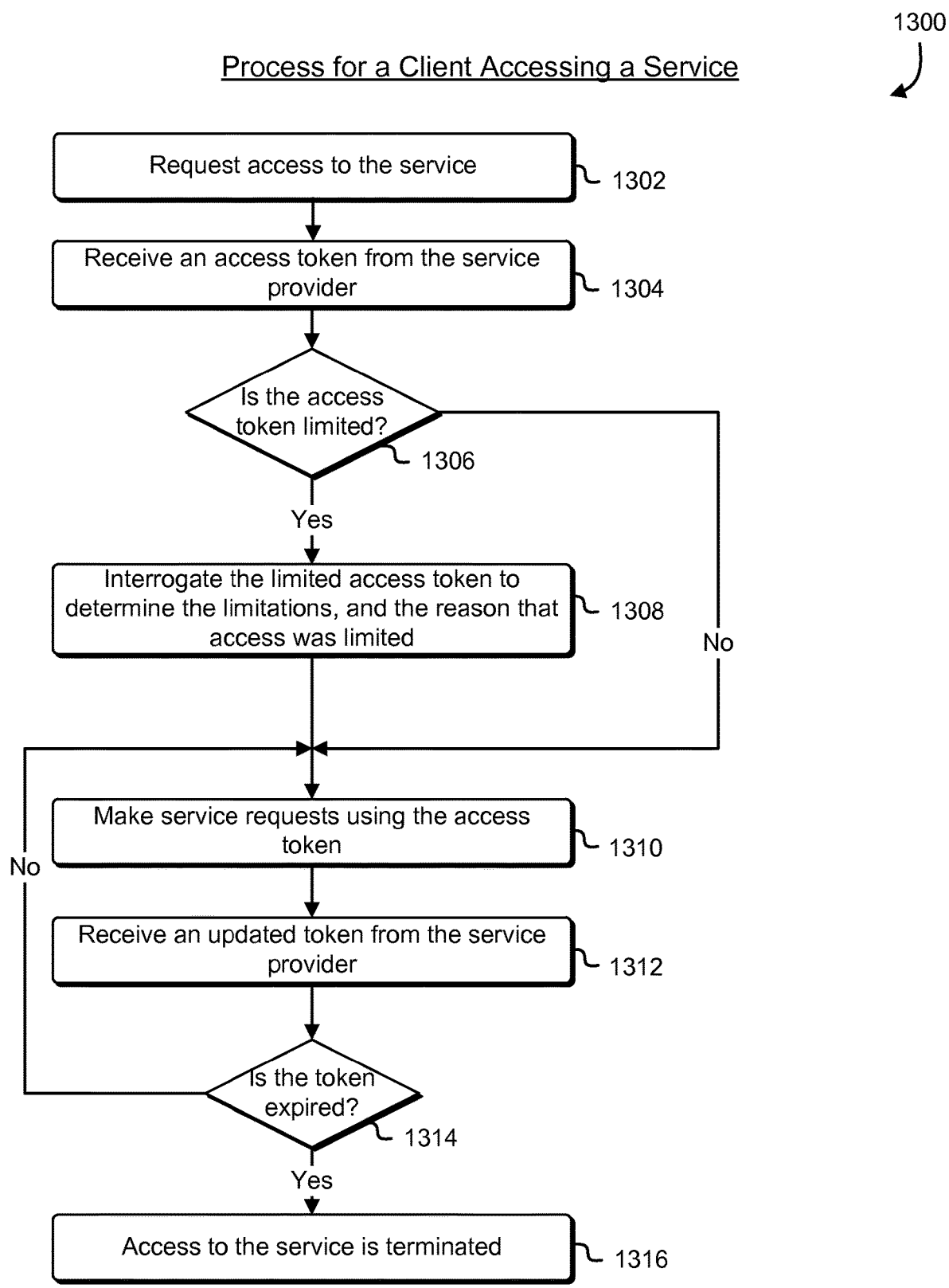
FIG. 13 shows an illustrative example of a process that, when performed by a client computer, accesses a service provider, in accordance with an embodiment.

FIG. 13 shows an illustrative example of a process that, when performed by a client computer, accesses a service provider, in accordance with an embodiment. The process diagram 1300 shows how a client requests resources from a service, receives an access token in response to the request, and uses the access token to make repeated requests to the service provider. In block 1302, the client issues a request for resources to the service provider. At block 1304, the service provider responds with an access token. If the service provider does not provide an access token, or if the service provider provides an access token that indicates that the request is denied, then the process ends at block 1304. If the client determines 1306 that the access token provided by the service provider is a limited access token, the client interrogates 1308 the limited access token to determine the access limitations, and any expiration associated with the limited access. In some implementations, the client can examine the access policy that permitted the limited access, and further identify a superior access policy that would permit non-limited access. When a superior access policy is identified, the client can examine the condition required by the superior access policy to establish a reason that only limited access was granted.

In some implementations, the client determines a reason that access is limited by examining an issuing-limited-access-policy data field of the limited access token to determine an issuing limited access policy. The client then examines a superior-access-policy data field of the issuing limited access policy to determine a non-limited access policy that is capable of producing a non-limited access token to replace the limited access token. In some situations, the superior-access-policy data field references another limited access policy. When another limited access policy is referenced, the client continues to reference the superior-access-policy data field recursively until a non-limited access policy is identified. Once the non-limited access policy is identified, the client extracts a condition from a condition data field of the non-limited access policy, and determines particular terms of the condition that are not met by the client's request. The client can report unsatisfied terms of the condition to the user along with the limitations imposed by the limited access token.

For example, a condition associated with a non-limited access policy might include three logical terms, A, B, and C, with the condition represented by the logical expression (A AND B AND C). If term A is satisfied (true in this example), and terms B and C are not satisfied (false), the entire expression is unsatisfied (false), and the associated non-limited access policy does not grant a request. If an associated limited access policy does allow the request to be granted, then the reason that the request was limited was because terms B and C were not satisfied. The definition of terms B and C (or information based at least in part thereon, such as a statement mapped to each term) can, in some implementations, be communicated to the client in addition to the limited access token. In certain implementations, a reason is communicated by mapping a statement to one or more terms of a condition associated with a non-limited access policy. For example, when element A requires that a client use a secure protocol, and when element is not satisfied, the system can communicate the reason using the statement "Access is limited because the client is not using a secure network protocol."

At block 1310, the client begins a sequence of service requests by transmitting the access token along with a request to the service provider. The service provider performs the request, updates the token, and returns the updated token to the client. The client receives the updated token from the service at block 1312. When the access token is a limited access token, the token received from the service provider will, in general, be modified to account for service usage associated with the request. The client examines the updated token and determines 1314 if the access token is expired. If the token is not expired, the client can make additional service requests at block 1310. When the client determines that the access token is expired, execution proceeds to block 1316, where the client reports to the user that the access token has expired, and access to the resource is terminated.

Figure 14:
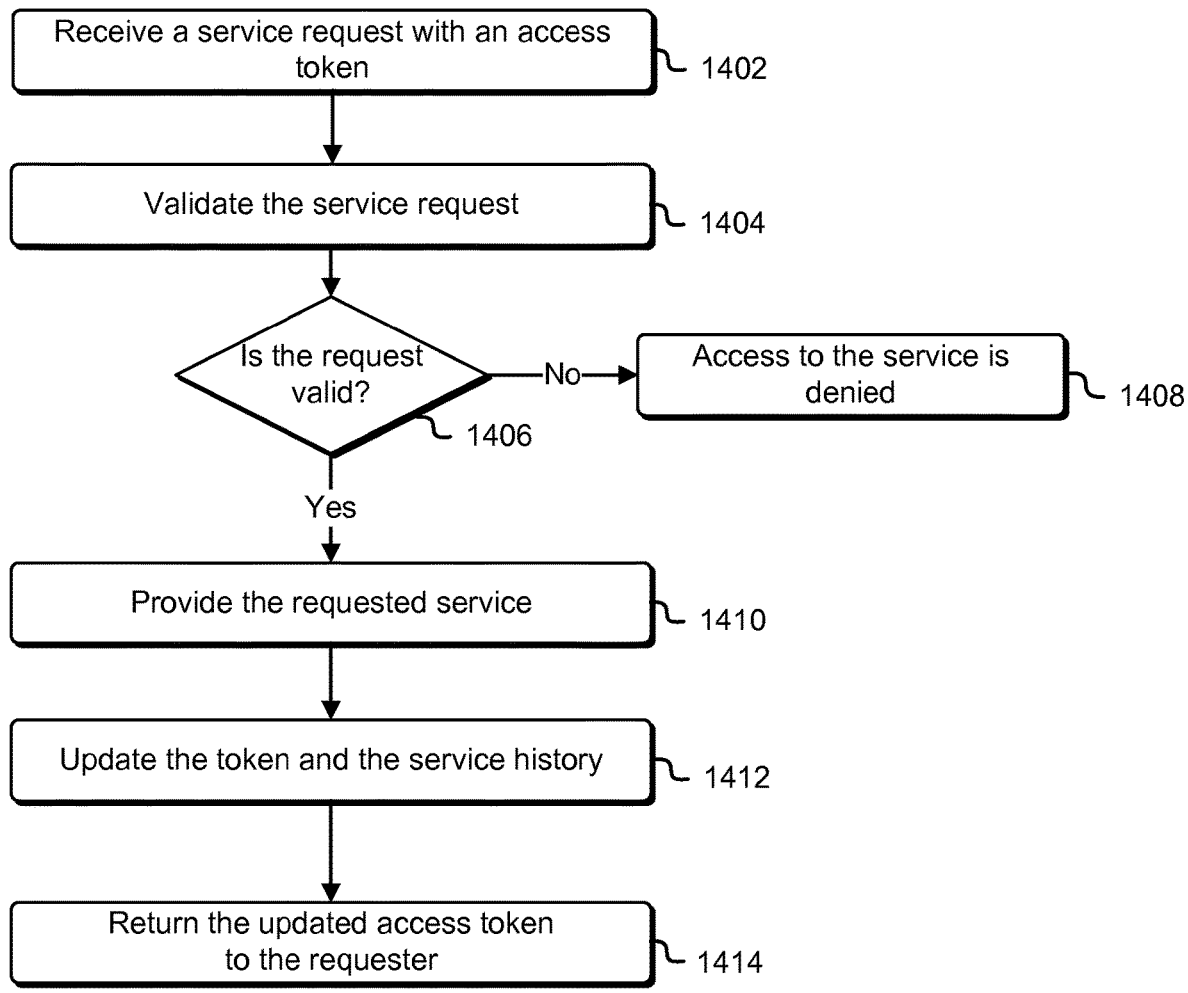
FIG. 14 shows an illustrative example of a process that, when performed by a resource server, processes a request to access a service provider in accordance with an embodiment.

FIG. 14 shows an illustrative example of a process 1400 that, when performed by a resource server, processes a request to access a service provider in accordance with an embodiment. At block 1402, a service provider receives a request for services along with an access token from a client. At block 1404, the resource server validates the request by checking a digital signature of the access token and confirming that the access token grants the requested level of access. If the resource server determines 1406 that the access token is not valid, access to the resource is denied 1408. When the resource server determines 1406 that the access token is valid, the resource server provides 1410 the requested service. At block 1412, the resource server updates the access token to reflect the resources used by the request, and updates an access history database. The updated access token is returned 1414 to the client for use in making further requests.

Figure 15:
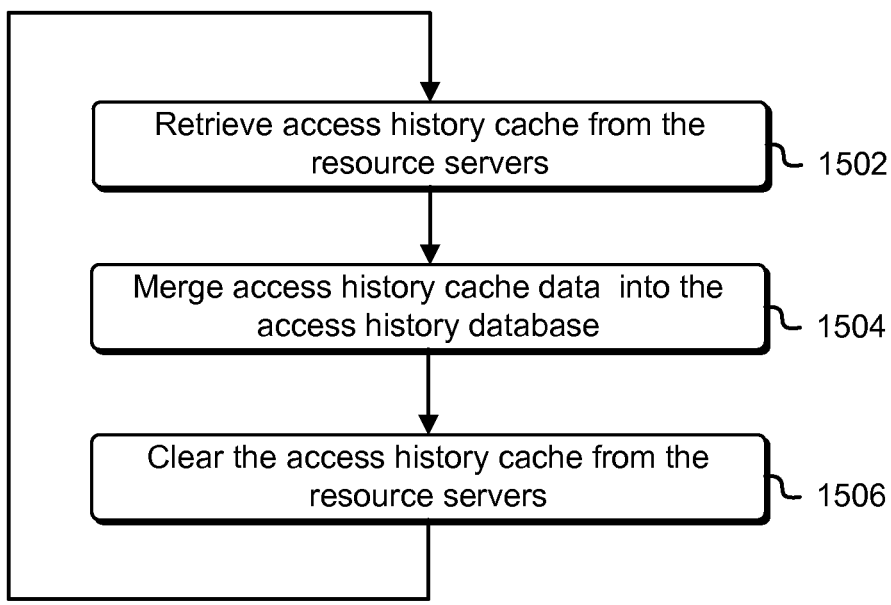
FIG. 15 shows an illustrative example of a process that, when performed by an authorization server, synchronizes access token information with resource servers in accordance with an embodiment.

FIG. 15 shows an illustrative example of a process that, when performed by an authorization server, synchronizes access token information with resource servers in accordance with an embodiment. In the process 1500, an authorization server merges access history from a number of access history databases maintained by resource servers into a central access history database. At block 1502, the authorization server retrieves access history data from the resource servers. At block 1504, the authorization server merges the access history information into the central access history database. In some implementations, the access history data is merged by adding the merged records to the central database. In another implementation, the access history data is merged by combining access information under common clients and access policies. At block 1506, the access history caches maintained by the resource servers are processed to remove those access history records that are merged into the central database. The process 1500 repeats periodically to maintain an up-to-date record of access history in the central database.

Figure 16:
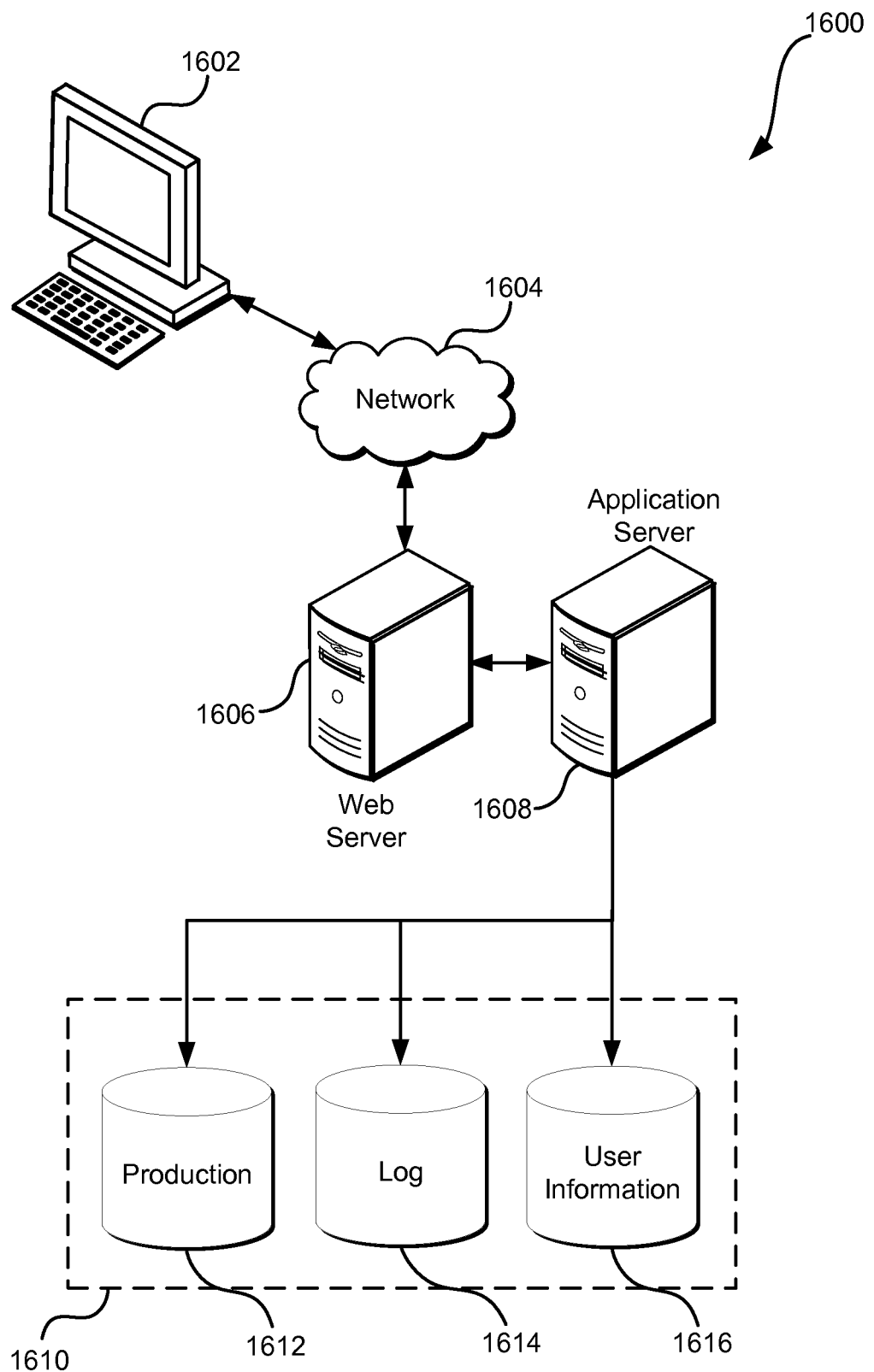
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part on the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1602 and the application server 1608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or example language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer implemented method, comprising:
    receiving, from a client, a request to access a service;
    determining that the request is disallowed by an access policy;
    as a result of determining that the request is disallowed by the access policy, determining that a limited access policy permits fulfillment of the request, the limited access policy specifying a resource and at least one of multiple actions to which the limited access policy applies, the limited access policy linked to the access policy through an access policy database; and
    as a result of determining that the limited access policy permits the request to be fulfilled:
    fulfilling the request;
    granting the client access to the service subject to a limitation specific to at least one of the client or the request and determined by the limited access policy, wherein the limitation comprises a maximum amount of computing resources usable to perform the request; and
    transmitting a notification indicating violation of the access policy and application of the limited access policy to fulfill the request.

2. The computer-implemented method of claim 1, wherein granting access to the client includes generating a token with an expiration and providing the token to the client.

3. The computer-implemented method of claim 2, wherein the expiration is updated based at least in part on an amount of computing resources used to perform the request.

4. The computer-implemented method of claim 1, further comprising:

determining a reason that access to the service is limited, the reason determined by identifying one or more unsatisfied logical terms from a logical expression that represents a condition associated with the access policy; and wherein the notification identifies the unsatisfied logical terms.

5. A system, comprising at least one computing device that implements one or more services, wherein the system:
   determines that a request from an entity is not allowed by an access policy; and
   as a result of the request being disallowed by the access policy:
      identifies a limited access policy that allows fulfillment of the request, the limited access policy specifying at least one resource and at least one of multiple actions to which the limited access policy applies, the limited access policy linked to the access policy through an access policy database, the limited access policy specific to the entity; and
      allows, to the entity, additional requests in accordance with a limitation defined by the limited access policy, wherein the limitation comprises an amount of resources used to fulfill at least one of the request or the additional requests.

6. The system of claim 5, wherein the system further controls access to the one or more services by transmitting a notification that indicates the failure of the access policy and the use of the limited access policy.

7. The system of claim 5, wherein fulfillment of the request includes recording information that identifies the entity and the limited access policy in a database accessible to the one or more computer systems thereby causing the additional requests to be allowed in accordance with the limitation.

8. The system of claim 5, wherein the system further controls access to the one or more services by:
   receiving an access token from the entity, the access token including an expiration;
   updating the expiration of the access token to result in an updated access token;
   making the updated access token cryptographically verifiable to result in a cryptographically verifiable and updated access token; and
   sending the cryptographically verifiable and updated access token to the entity.

9. The system of claim 8, wherein updating the expiration of the access token is based at least in part on an amount of resources used by the request.

10. The system of claim 8, wherein the system further controls access to the one or more services by:
    receiving the request from the entity; and
    fulfilling the request.

11. The system of claim 8, wherein the system further controls access to the one or more services by authorizing the request by validating a cryptographically verifiable access token.

12. The system of claim 8, wherein the system further controls access to the one or more services by:
    determining whether the access token is expired; and
    as a result of the access token is expired:
       identifying a second limited access policy that can permit the request to be fulfilled, and
       issuing a second access token based at least in part on a second limited access policy that permits the request to be fulfilled.

13. A non-transitory computer-readable storage medium having stored thereon executable instructions that, as a result of execution by one or more processors of a computer system, cause the computer system to at least:
    determine that a request is disallowed by an access policy; and
    as a result of the request being disallowed by the access policy:
       determine whether a limited access policy having an expiration that is associated with the access policy through an access policy database permits the request at least because the limited access policy has not expired, the limited access policy specifying at least one resource and at least one action of multiple actions to which the limited access policy applies;
       as a result of the request being permitted by the limited access policy, permit additional requests to be fulfilled that conform to a limitation associated with the expiration of the limited access policy, wherein the limitation comprises at least one of a maximum amount of computing resources usable to fulfill the additional requests or a number of additional requests; and
       send a notification that indicates that the request was disallowed by the access policy and indicates application of the limited access policy to fulfil the request.

14. The non-transitory computer-readable storage medium of claim 13, wherein the instructions further comprise instructions that, as a result of execution by the one or more processors, cause the computer system to:
    determine one or more unsatisfied elements of a condition of the access policy by; and
    send a notification that identifies the unsatisfied elements.

15. The non-transitory computer-readable storage medium of claim 13, wherein the instructions further comprise instructions that, as a result of execution by the one or more processors, cause the computer system to:
    determine whether a requester has been granted previous requests that exceed a limitation established by the limited access policy; and
    as a result of the limitation established by the limited access policy being exceeded, determine that the limited access policy disallows the request.

16. The non-transitory computer-readable storage medium of claim 13, wherein the instructions further comprise instructions that, as a result of execution by the one or more processors, cause the computer system to:
    create an access token with an expiration value; and
    provide the access token to the client.

17. The non-transitory computer-readable storage medium of claim 16, wherein the instructions further comprise instructions that, as a result of execution by the one or more processors, cause the computer system to:
    update the expiration value of the access token;
    determine whether the access token is expired; and
    as a result of the access token being expired, revoke the limited access to the service.

18. The non-transitory computer-readable storage medium of claim 16, wherein the expiration value is updated based at least in part on an amount of network bandwidth used as a result of fulfilling the request.

19. The non-transitory computer-readable storage medium of claim 16, wherein the instructions further comprise instructions that, was a result of execution by the one or more processors, cause the computer system to:

assign the request to a particular backend server using a load balancer;

authorize the request by cryptographically verifying the access token at the particular service server;

record the amount of resources used in fulfilling the request, the time of the request, the identity of the requester, and the access policy that permitted the request to be fulfilled, in an access history cache stored on the particular server; and merge the information from the access history cache into an access history database stored on an authorization server.

20. The non-transitory computer-readable storage medium of claim 16, wherein:

the instructions further comprise instructions that, as a result of execution by the one or more processors, cause the computer system to:

update the expiration of the access token;

determine whether the access token is expired; and as a result of the access token being expired, issue a second access token based at least in part on a second limited access policy that permits the request to be fulfilled;

wherein the second access token provides fewer access rights than the access token.

* * * * *